(12) United States Patent  
Nishiwaki et al.

(10) Patent No.: US 8,331,213 B2  
(45) Date of Patent: Dec. 11, 2012

(54) INFORMATION RECORDING MEDIUM, INFORMATION REPRODUCING DEVICE AND METHOD, AND APPARATUS AND METHOD FOR MANUFACTURING INFORMATION RECORDING MEDIUM

(75) Inventors: Hiroshi Nishiwaki, Tokorozawa (JP); Eiji Muramatsu, Tokorozawa (JP); Michikazu Horie, Tokyo (JP); Kenjirou Kiyono, Tokyo (JP)

(73) Assignees: Pioneer Corporation, Tokyo (JP); Mitsubishi Kagaku Media Co., Ltd., Tokyo (JP)

( * ) Notice: Subject to any disclaimer, the term of this patent is extended or adjusted under 35 U.S.C. 154(b) by 974 days.

(21) Appl. No.: 11/988,797

(22) PCT Filed: Jul. 13, 2006

(86) PCT No.: PCT/JP2006/313973  
§ 371 (c)(1), (2), (4) Date: Jan. 15, 2008

(87) PCT Pub. No.: WO2007/010825  
PCT Pub. Date: Jan. 25, 2007

(65) Prior Publication Data  
US 2009/0207713 A1    Aug. 20, 2009

(30) Foreign Application Priority Data  
Jul. 15, 2005   (JP) .................... 2005-206594

(51) Int. Cl.  
*G11B 7/00* (2006.01)
(52) U.S. Cl. .................. 369/275.4; 369/44.26
(58) Field of Classification Search .............. 369/275.4, 369/44.26, 44.27  
See application file for complete search history.

(56) References Cited

U.S. PATENT DOCUMENTS

| 6,411,592 | B1 * | 6/2002 | Nishiuchi et al. | 369/275.4 |
| 7,102,989 | B2 * | 9/2006 | Suh et al. | 369/275.3 |
| 2003/0072251 | A1 * | 4/2003 | Kondo | 369/275.3 |
| 2005/0237879 | A1 * | 10/2005 | Kondo et al. | 369/44.27 |

FOREIGN PATENT DOCUMENTS

| JP | 8-293129 | 11/1996 |
| JP | 2003-281739 | 10/2003 |
| JP | 2003-346384 | 12/2003 |

* cited by examiner

*Primary Examiner* — Latanya Bibbins  
(74) *Attorney, Agent, or Firm* — Young & Thompson

(57) ABSTRACT

An information recording medium (100) is provided with (i) a first information recording area wherein a first track for reproducing first information based on a first track pitch is formed by a laser beam, and (ii) a second information recording area wherein a second track for reproducing second information based on a second track pitch different from the first track pitch is formed by a laser beam. The groove shape of the first track is different from the groove shape of the second track.

5 Claims, 14 Drawing Sheets

(a)

(b)

INFORMATION RECORDING MEDIUM, INFORMATION REPRODUCING DEVICE AND METHOD, AND APPARATUS AND METHOD FOR MANUFACTURING INFORMATION RECORDING MEDIUM

TECHNICAL FIELD

The present invention relates to an information recording medium, such as a DVD (Digital Versatile Disc), a BD (Blu-ray Disc), and a CD (Compact Disc), an information reproducing apparatus, such as a DVD player, for and an information reproducing method of reproducing information recorded on the information recording medium, and an apparatus for and a method of producing the information recording medium.

BACKGROUND ART

In an information recording medium of a recording type, such as a CD-R (Compact Disc-Recordable), a DVD-R, a DVD-RW, a DVD+R, and a BD-RE (Blu-ray Disc Rewritable), for example, laser light for recording is focused or condensed on at least one of recording layers laminated or pasted on a substrate, to thereby record information into the recording layer in an irreversible change recording method by heat or in a rewritable method. Alternatively, management information is recorded in advance in a management information recording area or the like, for example, which is provided in the recording layer. The management information herein is various information for managing the information recording medium, such as information about recording features, like an optimum recording power or the like, and attribute information for specifying the type of the medium. More specifically, in the DVD-R, the management information is recorded in advance by the laser light. Alternatively, in the DVD-RW, the management information is recorded in advance by forming embossed pits on the inner circumferential side.

In particular, in the BD-RE in which recording or reproduction is performed by the laser light with a relatively short wavelength, such as a BD with a wavelength of 405 nm, the management information is recorded in advance by a groove track in a modulation method different from that in a user data area. In addition, the management information is the only unique information which could know the characteristics of the optical disc and it is important. Thus, there is also proposed a method of relatively increasing a track pitch to prevent a reduction in reproduction quality, caused by an influence from an adjacent track, i.e. crosstalk, such that the management information can be read, certainly and properly, by an information recording/reproducing apparatus, such as a drive. In particular, in the BD-RE, its spot diameter is relatively smaller than the spot diameter of the DVD or the like, for example. Thus, relatively increasing the track pitch as described above is effective in terms of improving the reproduction quality.

Patent document 1: Japanese Patent Application Laid Open NO. 2003-346384

DISCLOSURE OF INVENTION

Subject to be Solved by the Invention

However, in the information recording medium of the BE-RE or the like, as described above, the management information recording area whose track pitch is set to be larger than the track pitch of the user data area, is disposed on the inner circumferential side of the user data area.

Thus, if the depth of the groove of the groove track is substantially uniform in a signal surface of the information recording medium, the amplitude of a push-pull signal, generated on the basis of a difference between detection signals detected from two-divided light receiving surfaces, relatively increases in response to the relatively large track pitch in the management information recording area.

Thus, there is such a technical problem that on a drive circuit for driving an actuator to displace an objective lens in a focusing direction and in a tracking direction, for example, a leakage noise caused by the push-pull signal with a relatively large amplitude obtained from the management information recording area, is a disturbance to and has an adverse effect on a focus error signal, under focus control, such as astigmatism, which likely results in failure of the focus control.

In order to solve the above-exemplified problem, it is therefore an object of the present invention to provide an information recording medium, an information reproducing apparatus, and an information reproducing method, which enable information to be reproduced or the like, more simply and highly accurately, even on the information recording medium in which a plurality of types of track pitches are set, for example, as well as an apparatus for and a method of manufacturing the information recording medium, and a computer program which makes a computer function as the information reproducing apparatus and the manufacturing apparatus.

Means for Solving the Object (Information Recording Medium)

Hereinafter, the information recording medium of the present invention will be explained.

The above object of the present invention can be achieved by an information recording medium provided at least with: a first information recording area (a user data area or a first management information recording area) in which a first track is formed to record or reproduce first information (user information: user data) by laser light on the basis of a first track pitch; and a second information recording area (a second management information recording area: a pre-recording area) in which a second track is formed to record or reproduce second information (management information) by the laser light on the basis of a second track pitch different from the first track pitch, a groove shape of the first track being different from a groove shape of the second track.

According to the information recording medium of the present invention, at least one recording layer is laminated on a disc-shaped substrate, for example. In the first information recording area of this recording layer, the first information, such as audio, video information, content information, or user data, can be recorded or reproduced, by the laser light with a relatively short wavelength, such as a BD with a wavelength of 405 nm, for example, on the basis of the first track pitch, through the first track constructed from a groove track and a land track or the like. In the second information recording area of this recording layer, the second information, such as the management information can be recorded or reproduced, by the laser light, such as the BD, on the basis of the second track pitch, through the second track constructed from a groove track and a land track or the like.

Particularly, in the present invention, the groove shape, e.g. depth and width, of the second information recording area, such as the management information recording area, is relatively changed, or the groove is cut or separated. By this, the groove shape of the second information recording area is different from the groove shape of the first information recording area, such as the user data area. Incidentally, the groove shape may differ in the groove track constituting the track, or the groove shape may differ in the land track constituting the track. Therefore, in the present invention, it is possible to reduce the amplitude of a push-pull signal obtained from the second information recording area, and make it closer to the amplitude of a push-pull signal from the first information recording area. Specifically, in the groove shape of the second information recording area, although the track pitch is relatively large, the depth is relatively shallow, or the width is relatively narrow, or the groove is separated. By these facts, it is possible to change the amplitude of the push-pull signal, generated on the basis of a difference between one detection signal and another detection signal respectively detected from two light receiving surfaces aligned along radial direction, for example, so as to take a proper value, in tracking control by an information reproducing apparatus, for example.

As a result, on a drive circuit for driving an actuator to displace an objective lens in a focusing direction and in a tracking direction, for example, it is possible to reduce an influence on the focus control, such as astigmatism, which is caused by a leakage noise caused by the push-pull signal obtained from the second information recording area whose amplitude is reduced and made closer to that of the push-pull signal obtained from the first information recording area, and it is possible to almost or completely eliminate an adverse effect. Therefore, on the information reproducing apparatus described later, it is possible to perform various auto control including the focus control and the tracking control, more highly accurately, and it is possible to realize more highly accurate information reproduction.

In one aspect of the information recording medium of the present invention, a first absolute amount of at least one of a width and a depth of a groove of the first track is different from a second absolute amount of at least one of a width and a depth of a groove of the second track.

According to this aspect, on the basis of the first absolute amount and the second absolute amount of the information recording medium, it is possible to perform various auto control including the focus control and the tracking control, more highly accurately, and it is possible to realize more highly accurate information reproduction, on the information reproducing apparatus described later. The "absolute amount" herein indicates a distance (length).

In another aspect of the information recording medium of the present invention, the groove shape of one of the first track and the second track is formed so as to obtain a push-pull signal with a predetermined amplitude.

According to this aspect, on the basis of the groove shape of the track, such as the groove track, formed so as to obtain the push-pull signal with the predetermined amplitude of the information recording medium, it is possible to perform various auto control including the focus control and the tracking control, more highly accurately, and it is possible to realize more highly accurate information reproduction, on the information reproducing apparatus described later.

In another aspect of the information recording medium of the present invention, one of the first track and the second track is separated in a track direction (a time axis direction).

According to this aspect, on the basis of the groove shape of the track separated in the track direction (the time axis direction) of the information recording medium, it is possible to perform various auto control including the focus control and the tracking control, more highly accurately, and it is possible to realize more highly accurate information reproduction, on the information reproducing apparatus described later. The track direction herein is a direction on the signal surface, corresponding to a direction (or the time axis direction) in which a time of irradiating the light spot of the laser light flows in order to reproduce the signal. One specific example of the track direction is the tangential direction of the track which is formed spirally or concentrically.

In another aspect of the information recording medium of the present invention, one of the first track and the second track is separated in a predetermined gap ratio.

According to this aspect, on the basis of the track, such as the groove track, separated in the predetermined gap ratio of the information recording medium, it is possible to perform various auto control including the focus control and the tracking control, more highly accurately, and it is possible to realize more highly accurate information reproduction, on the information reproducing apparatus described later. The gap ratio herein may denote a ratio between (i) the length of a groove formed portion where the groove is formed and (ii) the length of a gap (space) where the groove is not formed. In addition, the gap ratio may be determined on the basis of the NA (Numerical Aperture) of a reproduction optical system, such as an objective lens or the like of an optical pickup, for example, and on the basis of the wavelength of the laser light. In addition, the predetermined gap ratio may indicate the average value (or average ratio) of various parameters in the whole signal surface of the information recording medium, or a ratio in a partial area.

In another aspect of the information recording medium of the present invention, one of the first track and the second track is separated in a predetermined gap ratio so as to obtain a push-pull signal with a predetermined amplitude.

According to this aspect, on the basis of the track separated in the predetermined gap ratio of the information recording medium, which allows the push-pull signal with the predetermined amplitude to be obtained, it is possible to perform various auto control including the focus control and the tracking control, more highly accurately, and it is possible to realize more highly accurate information reproduction, on the information reproducing apparatus described later.

In another aspect of the information recording medium of the present invention, one of the first track and the second track is separated in a predetermined gap ratio indicated by a ratio between (i) a length of a groove formed portion where a groove is formed and (ii) a length of a gap where a groove is not formed.

According to this aspect, on the basis of the track, such as the groove track, separated in the predetermined gap ratio of the information recording medium, which is indicated by the ratio between (i) the length of a groove formed portion where a groove is formed and (ii) the length of a gap where a groove is not formed, it is possible to perform various auto control including the focus control and the tracking control, more highly accurately, and it is possible to realize more highly accurate information reproduction, on the information reproducing apparatus described later.

In another aspect of the information recording medium of the present invention, in the first information recording area, user data can be recorded as the first information, and the second information recording area is located on an inner circumferential side of the first information recording area, and management information as for recording features of the laser light is recorded in advance as the second information in the second information recording area, on the basis of the second track pitch larger than the first track pitch.

According to this aspect, by the information reproducing apparatus described later, it is possible to perform various auto control including the focus control and the tracking control, more highly accurately, in the second information recording area located on the inner circumferential side, and it is possible to realize more highly accurate information reproduction.

In this aspect, the first track pitch may be 0.32 (μm) and the second track pitch may be 0.35 (μm).

By virtue of such construction, it is possible to comply with a predetermined standard of a BD (Blu-ray Disc) or the like, for example.

In another aspect of the information recording medium of the present invention, identification information (flag), which indicates whether or not the groove shape of the first track is different from the groove shape of the second track, is recorded in advance in at least one of said first information recording area and said second information recording area.

According to this aspect, by the information reproducing apparatus described later, it is possible to quickly and accurately judge whether or not the groove shape of the track, such as the groove track, is different on the basis of the obtained identification information, and it is possible to quickly and accurately reproduce the information on the information recording medium.

In this aspect, the information recording medium may be further provided with a judgment information recording area (BCA: Burst Cutting Area) in which judgment information is recorded in advance, the judgment information being capable of judging the information recording medium, the judgment information being capable of reading without relying on tracking control, and the identification information may be included in the judgment information.

By virtue of such construction, it is possible to reproduce the judgment information from the judgment information recording area, only by the rotation control of the optical disc, without the tracking control.

In another aspect of the information recording medium of the present invention, in the first information recording area, (i-1) a first groove track as the first track and (i-2) a first land track are alternately formed, and in the second information recording area, (ii-1) a second groove track as the second track and (ii-2) a second land track are alternately formed.

According to this aspect, on the information reproducing apparatus described later, it is possible to perform various auto control including the focus control and the tracking control, more highly accurately, and it is possible to realize more highly accurate information reproduction, by varying the shape of the groove track on the information recording medium.

In another aspect of the information recording medium of the present invention, the information recording medium is further provided with a plurality of recording layers to record therein a plurality of information, and at least one of the plurality of recording layers comprises the first information recording area and the second information recording area.

According to this aspect, it is possible to perform various auto control including the focus control and the tracking control, more highly accurately, and it is possible to realize more highly accurate information reproduction, by varying the groove shape of the track, such as the groove track, on the information recording medium of a multilayer type.

(Information Reproducing Apparatus)

Hereinafter, the information reproducing apparatus of the present invention will be discussed.

The above object of the present invention can be also achieved by an information reproducing apparatus for reproducing information recorded on an information recording medium provided at least with: a first information recording area (a user data area or a first management information recording area) in which a first track is formed to record or reproduce first information (user information: user data) by laser light on the basis of a first track pitch; and a second information recording area (a second management information recording area: a pre-recording area) in which a second track is formed to record or reproduce second information (management information) by the laser light on the basis of a second track pitch different from the first track pitch, a groove shape of the first track being different from a groove shape of the second track, identification information (flag), which indicates whether or not the groove shape of the first track is different from the groove shape of the second track, being recorded in advance in at least one of said first information recording area and said second information recording area, the information reproducing apparatus provided with: an optical pickup device for irradiating the laser light and receiving reflected light thereof; an obtaining device for obtaining the identification information; and a reproducing device for reproducing the first information and the second information, on the basis of an output of the optical pickup device and the obtained identification information.

According to the information reproducing apparatus of the present invention, at first, the laser light is irradiated by the optical pickup device, and the reflected light thereof is received. Simultaneously, or before or after this, the identification information (flag), which indicates whether or not the groove shape of the first track is different from the groove shape of the second track, is obtained by the obtaining device. Then, the first information and the second information are reproduced by the reproducing device, on the basis of the output of the optical pickup device and the obtained identification information.

As a result, by the information reproducing apparatus, it is possible to quickly and accurately judge whether or not the groove shape of the track is different on the basis of the obtained identification information, and it is possible to quickly and accurately reproduce the information on the information recording medium.

Incidentally, in response to the various aspects of the above-mentioned information recording medium of the present invention, the information reproducing apparatus of the present invention can also adopt various aspects.

In one aspect of the information reproducing apparatus of the present invention, the information recording medium further comprises a judgment information recording area (BCA: Burst Cutting Area) in which judgment information is recorded in advance, the judgment information being capable of judging the information recording medium, the judgment information being capable of reading without relying on tracking control, and the identification information is included in the judgment information, the information reproducing apparatus further comprises a reading device capable of reading the judgment information without relying on tracking control, and the reproducing device further reproduces the first information and the second information, on the basis of the read judgment information.

According to this aspect, it is possible to reproduce the judgment information from the judgment information recording area, only by the rotation control of the optical disc, without the tracking control.

(Manufacturing Apparatus of Information Recording Medium)

Hereinafter, the manufacturing apparatus of the information recording medium of the present invention will be discussed.

The above object of the present invention can be also achieved by a manufacturing apparatus for manufacturing an information recording medium provided at least with: a first information recording area (a user data area or a first management information recording area) in which a first track is formed to record or reproduce first information (user information: user data) by laser light on the basis of a first track pitch; and a second information recording area (a second management information recording area: a pre-recording area) in which a second track is formed to record or reproduce second information (management information) by the laser light on the basis of a second track pitch different from the first track pitch, the manufacturing apparatus provided with: a master preparing device (spin coating of photoresist) for preparing a master corresponding to (i) a first absolute amount of at least one of a width and a depth of a groove of the first track or (ii) a second absolute amount of at least one of a width and a depth of a groove of the second track, on the basis of spin coating; a master processing device (laser cutting) for processing the master so as to correspond to each of the first absolute amount and the second absolute amount, on the basis of a laser power of laser light for cutting; a stampa preparing device for preparing a stampa from the master, on the basis of electroforming; and a molding device (including an injection molding machine and application of a reflective film) for (injection-) molding said information recording medium by the stampa.

According to the manufacturing apparatus of the information recording medium of the present invention, a master corresponding to (i) the first absolute amount of at least one of the width and the depth of a groove of the first track or (ii) the second absolute amount of at least one of the width and the depth of a groove of the second track is prepared by the master preparing device, on the basis of the spin coating of photoresist, for example.

Then, the master is processed by the master processing device so as to correspond to the first absolute amount and the second absolute amount, on the basis of the laser power of laser light for laser cutting. Then, a stampa is prepared by the stampa preparing device, from the processed master, on the basis of electroforming. Then, the information recording medium is injection-molded, for example, by the molding device, such as an injection molding machine, by using the prepared stampa. Then after a process of applying a reflective film or the like, the information recording medium is manufactured.

As a result, it is possible to manufacture the information recording medium on which the groove shape of the first track is different from the groove shape of the second groove track, more simply and highly accurately.

Incidentally, in response to the various aspects of the above-mentioned information recording medium of the present invention, the manufacturing apparatus of the information recording medium of the present invention can also adopt various aspects.

In one aspect of the manufacturing apparatus for manufacturing the information recording medium of the present invention, it is further provided with a separating device for separating at least one of the first track and the second track formed on the molded information recording medium in a track direction.

According to this aspect, it is possible to manufacture the information recording medium on which the groove of the track is separated by the separating device, more simply and highly accurately.

(Information Reproducing Method)

Hereinafter, the information reproducing method of the present invention will be discussed.

The above object of the present invention can be also achieved by an information reproducing method on an information reproducing apparatus, including an optical pickup device for irradiating laser light and receiving reflected light thereof, to reproduce information recorded on an information recording medium provided at least with: a first information recording area (a user data area or a first management information recording area) in which a first track is formed to record or reproduce first information (user information: user data) by the laser light on the basis of a first track pitch; and a second information recording area (a second management information recording area: a pre-recording area) in which a second track is formed to record or reproduce second information (management information) by the laser light on the basis of a second track pitch different from the first track pitch, a groove shape of the first track being different from a groove shape of the second track, identification information (flag), which indicates whether or not the groove shape of the first track is different from the groove shape of the second track, being recorded in advance in at least one of said first information recording area and said second information recording area, the information reproducing method provided with: an obtaining process of obtaining the identification information; and a reproducing process of reproducing the first information and the second information, on the basis of an output of the optical pickup device and the obtained identification information.

According to the information reproducing method of the present invention, it is possible to receive the various benefits owned by the above-mentioned information reproducing apparatus of the present invention.

Incidentally, in response to the various aspects of the above-mentioned information reproducing apparatus of the present invention, the information reproducing method of the present invention can also adopt various aspects.

(Manufacturing Method of Information Recording Medium)

Hereinafter, the manufacturing method of the information recording medium of the present invention will be discussed.

The above object of the present invention can be also achieved by a manufacturing method of manufacturing an information recording medium provided at least with: a first information recording area (a user data area or a first management information recording area) in which a first track is formed to record or reproduce first information (user information: user data) by laser light on the basis of a first track pitch; and a second information recording area (a second management information recording area: a pre-recording area) in which a second track is formed to record or reproduce second information (management information) by the laser light on the basis of a second track pitch different from the first track pitch, the manufacturing method provided with: a master preparing process (spin coating of photoresist) of preparing a master corresponding to (i) a first absolute amount of at least one of a width and a depth of a groove of the first track or (ii) a second absolute amount of at least one of a width and a depth of a groove of the second track, on the basis of spin coating; a master processing process (laser cutting) of processing the master so as to correspond to each of the first absolute amount and the second absolute amount, on the basis of a laser power of laser light for cutting; a stampa preparing process of preparing a stampa from the master, on the basis of electroforming; and a molding process (including an injection molding machine and application of a reflective film) of (injection-) molding said information recording medium by the stampa.

According to the manufacturing method of the information recording medium of the present invention, it is possible to receive the various benefits owned by the above-mentioned manufacturing apparatus of the information recording medium of the present invention.

Incidentally, in response to the various aspects of the above-mentioned manufacturing apparatus of the information recording medium of the present invention, the manufacturing method of the information recording medium of the present invention can also adopt various aspects.

These effects and other advantages of the present invention will become more apparent from the following embodiments.

As explained above, according to the information recording medium of the present invention, it is provided at least with: the first information recording area in which the first track is formed to record or reproduce the first information by laser light on the basis of the first track pitch; and the second information recording area in which the second track is formed to record or reproduce the second information by the laser light on the basis of the second track pitch different from the first track pitch, a groove shape of the first track being different from a groove shape of the second track. Consequently, on the information reproducing apparatus, it is possible to perform various auto control including the focus control and the tracking control, more highly accurately, and it is possible to realize more highly accurate information reproduction.

According to the information reproducing apparatus or method, it is provided with: the optical pickup device; the obtaining device or process; and the reproducing device or process. Consequently, it is possible to quickly and accurately judge whether or not the groove shape of the track is different, on the basis of the obtained identification information, and it is possible to quickly and accurately reproduce the information, on the information recording medium.

According to the manufacturing apparatus or method of the present invention, it is provided with: the master preparing device; the master processing device or process; the stampa preparing device or process; and the molding device or process. Consequently, it is possible to manufacture the information recording medium on which the groove shape of the first track is different from the groove shape of the second track, more simply and highly accurately.

Figure 1:
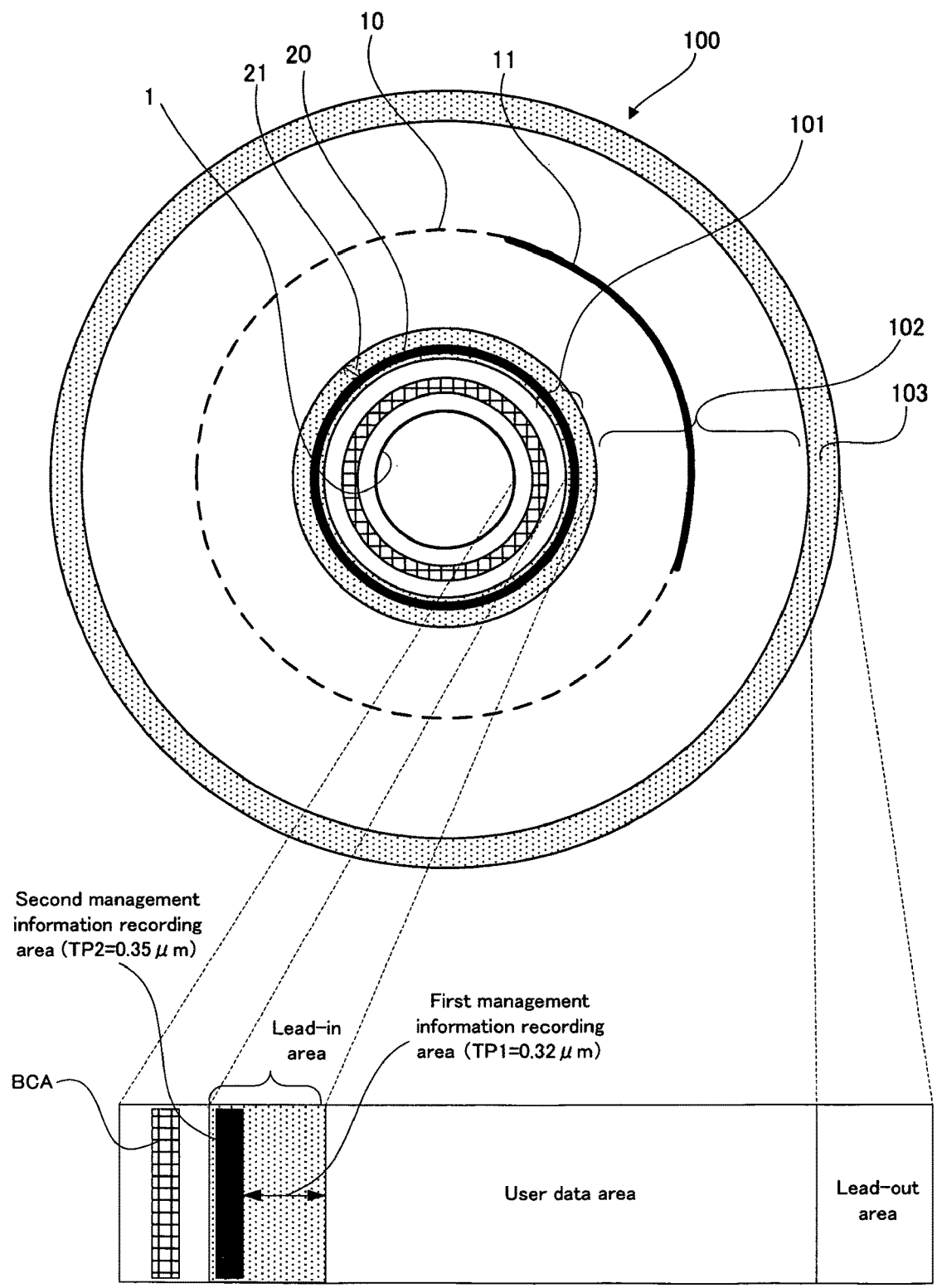
FIG. 1 is a substantial plan view showing the basic structure of an optical disc 100 in a first embodiment of the information recording medium of the present invention, and a conceptual view schematically showing a recording area structure in the radial direction and associated with the plan view.

DESCRIPTION OF REFERENCE CODES 1 center hole
10 track
11 ECC block
20 second management information recording area
21 first management information recording area
50 mastering apparatus
100 optical disc
101 lead-in area
102 user data area
103 lead-out area
104 middle area
200 information reproducing apparatus
CK1 first clock signal CK2 second clock signal
TP1 (TP2) track pitch

BEST MODE FOR CARRYING OUT THE
INVENTION

Hereinafter, embodiments of the present invention will be discussed with reference to the drawings.
(1) First Embodiment of Information Recording Medium
At first, with reference to FIG. 1 to FIG. 7, a first embodiment of the information recording medium of the present invention will be discussed.
(1-1) Basic Structure
At first, with reference to FIG. 1, the basic structure of an optical disc according to the first embodiment of the information recording medium of the present invention will be discussed. FIG. 1 is a substantial plan view showing the basic structure of an optical disc 100 in a first embodiment of the information recording medium of the present invention, and a conceptual view schematically showing a recording area structure in the radial direction and associated with the plan view.

As shown in FIG. 1, an optical disc 100 in the embodiment has a recording surface on a disc main body with a diameter of about 12 cm, as is a DVD. On the recording surface, the optical disc 100 is provided with: a BCA (Burst Cutting Area); a lead-in area 101 including a first management information recording area 21 and a second management information recording area 20; a user data area 102; and a lead-out area 103, from the inner to the outer circumferential side, centered on a center hole 1. The "first and second management information recording areas" herein are recording areas in which the information about recording features, like an optimum recording power or the like, the attribute information for specifying the type of the optical disc, or the like is recorded in advance, as part or all of the management information of the optical disc. Incidentally, the track pitch of the first management information recording area 21 is set to 0.32 µm and the track pitch of the second management information recording area 21 is set to 0.35 µm. Particularly in the embodiment, one specific example of the first information recording area of the present invention is constructed from the user data area 102 or the first management information recording area, for example. In addition, one specific example of the second information recording area of the present invention is constructed from the second management information recording area, for example. Moreover, the BCA (Burst Cutting Area) is a recording area in which judgment information which can judge various attributes of the optical disc is recorded in advance. More specifically, in the BCA, the judgment information can be recorded in a bar-code format in low density over a plurality of tracks, and the judgment information can be reproduced only by the rotation control of the optical disc, without tracking control. Moreover, as a specific example of the judgment information, a manufacturer's serial number unique to each optical disc 100, i.e. a so-called media ID, or the like can be listed.

Then, in each recording area, a track or tracks 10, such as a groove track and a land track, are alternately placed, spirally or concentrically, centered on the center hole 1. On the track 10, data is divided and recorded by a unit of ECC (Error Correction Code) block 11. The ECC block 11 is a data management unit by which error correction of data can be performed.

Figure 2:
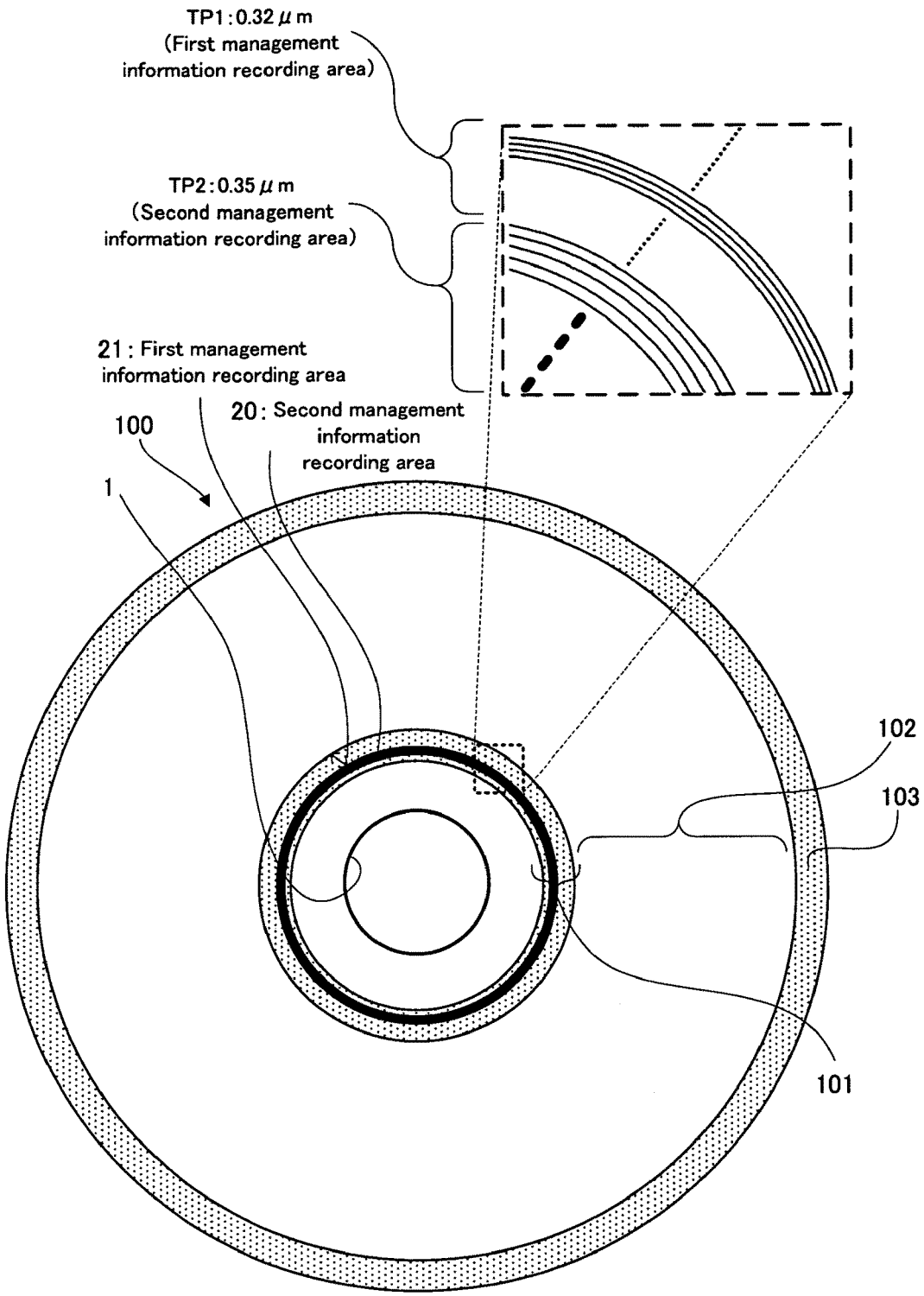
FIG. 2 is an enlarged plan view schematically showing the physical structure based on a track pitch of the optical disc in the first embodiment of the information recording medium of the present invention, and a corresponding schematic plan view.
Figure 3:
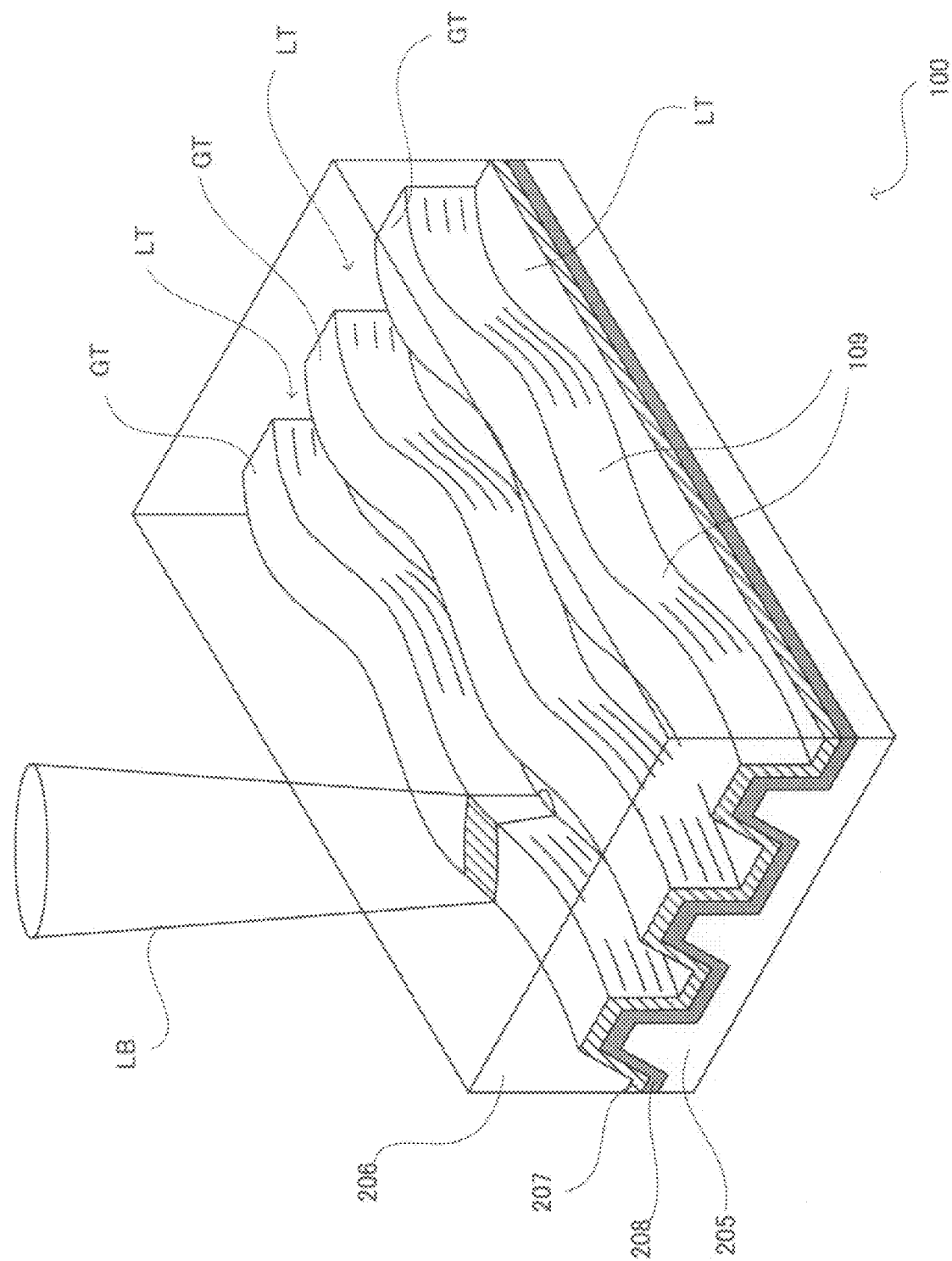
FIG. 3 is a partially enlarged perspective view showing the recording surface of the optical disc in the first embodiment of the information recording medium of the present invention.

Incidentally, the shape and the size of the optical disc 100 are not particularly limited to this, and needless to say, various sizes and various shapes may be adopted. For example, the optical disc 100 of the present invention is not limited to a single structure. As described later, it may be a two-layer single sided type, i.e., a dual layer type, or a two-layer double sided type, i.e., a dual layer double sided type. Furthermore, the optical disc 100 may be an optical disc of a multilayer type which has three or more layers.
(1-2) Physical Structure and Reproduction Features of Information Recording Medium
Next, with reference to FIG. 2 to FIG. 8, an explanation will be given for the physical structure of the optical disc, for example, corresponding to a reproduction feature based on a push-pull signal, in the embodiment of the information recording medium of the present invention.
(1-2-1) Outline of Physical Structure
At first, with reference to FIG. 2 and FIG. 3, an explanation will be given for the outline of the physical structure of the optical disc in the embodiment of the information recording medium of the present invention. FIG. 2 is an enlarged plan view schematically showing the physical structure based on a track pitch of the optical disc in the first embodiment of the information recording medium of the present invention, and a corresponding schematic plan view. FIG. 3 is a partially enlarged perspective view showing the recording surface of the optical disc in the first embodiment of the information recording medium of the present invention.

As shown in FIG. 2, on the optical disc in the embodiment of the information recording medium of the present invention, the groove track is formed on the basis of two types of track pitches. Specifically, the groove track (i.e. one specific example of the first track of the present invention) corresponding to the user data area is formed on the basis of the 0.32 (µm) of track pitch, for example. In addition, the groove track (i.e. one specific example of the second track of the present invention) corresponding to the user data area is formed on the basis of the 0.35 (µm) of track pitch, for example. As described above, by relatively increasing the track pitch of the second management information recording area 20 in which the management information for managing the optical disc is recorded in advance, it is possible to prevent a reduction in reproduction quality, caused by an influence from an adjacent track, i.e. crosstalk, and it is possible to realize assured reading of the management information by an information reproducing apparatus. In particular, like a BD or the like with a relatively short wavelength, such as a wavelength of 405 nm, if the spot diameter is smaller than the spot diameter of the DVD or the like, for example, relatively increasing the track pitch as described above is extremely effective and desirable in terms of improving the reproduction quality. Incidentally, in the optical disc in the embodiment of the information recording medium of the present invention, a transition area having various physical features different from those of the above-mentioned two types of recording areas may be disposed between the second management information recording area and the user data area, for example.

Next, with reference to FIG. 3, the physical structure on the recording surface of the optical disc in the embodiment of the information recording medium of the present invention will be discussed in detail. Incidentally, in FIG. 3, for convenience of explanation, the laser light is irradiated from the upper to the lower side, and a groove track GT is indicated by a convex portion and a land track LT is indicated by a concave portion, with respect to the irradiated laser light. In other words, if the laser light is irradiated from the lower to the upper side, the groove track GT is indicated by the concave portion and the land track LT is indicated by the convex portion, with respect to the irradiated laser light. Incidentally, note that a portion which is cut when a master described later is prepared is generally referred to as the groove (corresponding to the concave portion).

As shown in FIG. 3, in the optical disc 100 in the embodiment, a recording layer 207 of an irreversible change recording type by heat or the like, which constitutes the information recording surface, is laminated on (or on the lower side of, in FIG. 3) a disc-shaped protective layer 206, and moreover, a reflective film 208 is laminated thereon (or on the lower side thereof in FIG. 3). Then, a substrate 205 is formed on (or on the lower side of, in FIG. 3) the reflective film 208, to protect the optical disc 100 from dust and scratches or the like from the exterior. On the information recording surface constructed from the surface of the recording layer 207, the groove track GT and the land track LT are alternately formed. Incidentally, upon recording and reproduction of the optical disc 100, for example, as shown in FIG. 3, the groove track GT is irradiated with the laser light LB through the protective layer 206. For example, upon recording, the laser light LB is irradiated with a recording laser power, to thereby perform the irreversible change recording by heat of the like, with respect to the recording layer 207. On the other hand, upon reproduction, the laser light LB is irradiated with a reproduction laser power weaker than the recording laser power, and the record data written in the recording layer 207 is read. Incidentally, in the embodiment, record marks may be recorded in the groove track of the user data area, for example, or the record marks may be recorded in the land track.

Then, the groove track GT is wobbled, and the cycle of the wobble 119 is set to a predetermined value. By virtue of this wobble 119, it is possible to obtain information necessary to control the rotation of the disc during recording, to generate a reference clock B_CLK used at the time of recording operation, and to record the data, such as a recording address. Incidentally, by modulating the wobble 119 of the groove track GT in a predetermined modulation method, such as frequency modulation and phase modulation, it is also possible to record a pre-format address in advance.

(1-2-2) Groove Shape of Groove Track Locally Separated

Figure 4:
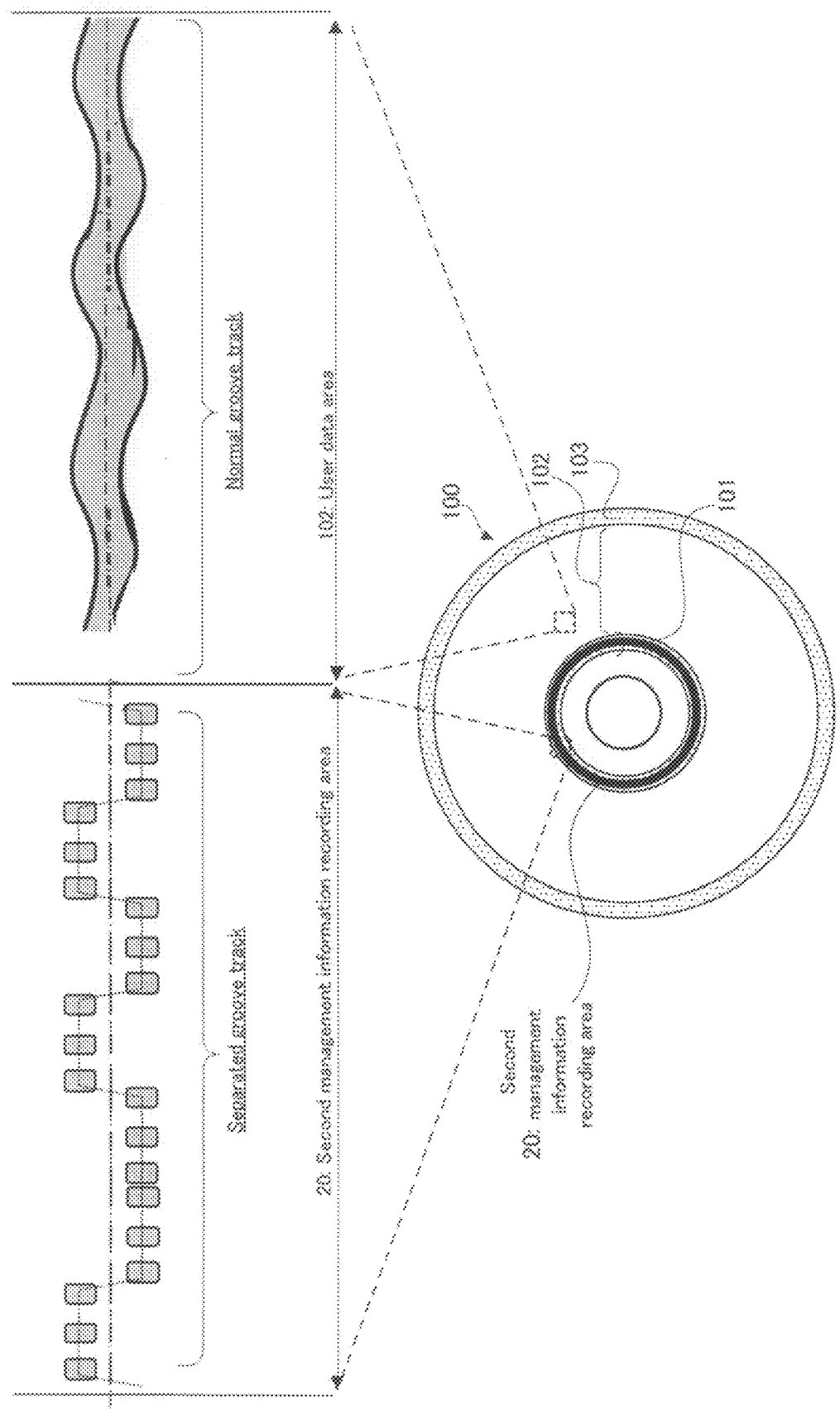
FIG. 4 is an enlarged plan view schematically showing the physical structure based on one specific example of a groove shape of a groove track, in the optical disc in the first embodiment of the information recording medium of the present invention, and a corresponding schematic plan view.

Next, with reference to FIG. 4, as the physical structure of the optical disc, for example, corresponding to a reproduction feature based on a push-pull signal, in the embodiment of the information recording medium of the present invention, the groove shape of the groove track logically cut or separated will be explained. FIG. 4 is an enlarged plan view schematically showing the physical structure based on one specific example of a groove shape of a groove track, in the optical disc in the first embodiment of the information recording medium of the present invention, and a corresponding schematic plan view.

As shown in FIG. 4, on the optical disc in the embodiment of the information recording medium of the present invention, the groove shape of the groove track formed in the user data area 102 is different from the groove shape of the groove track formed in the second management information recording area 20. Specifically, the groove shape of the groove track formed in the user data area 102 is not separated. In contrast, the groove shape of the groove track formed in the second management information recording area 20 is separated. In particular, a gray portion in FIG. 4 shows a portion in which the groove of the groove track is formed. More specifically, the groove shape of the groove track formed in the second management information recording area 20 may be separated in a predetermined gap ratio. The "predetermined gap ratio" herein may denote a predetermined ratio between (i) the length of a groove formed portion where the groove is formed and (ii) the length of a gap (space) where the groove is not formed. Alternatively, it may indicate a ratio between (i) the length of the groove formed portion and (ii) a sum of the length of the groove formed portion and the length of the space. Incidentally, the detailed explanation of the predetermined gap ratio will be described later. Moreover, in the embodiment, the separation (or cut) is performed in the groove track; however, it may be also performed in the land track.

Figure 5:
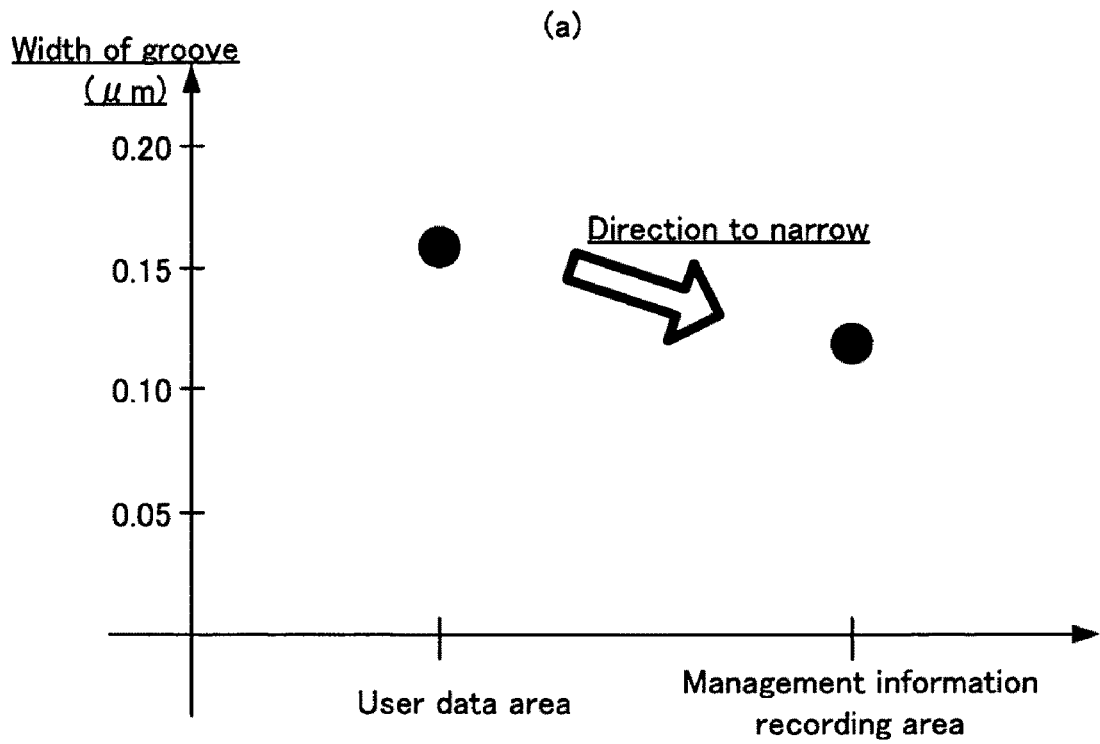
FIG. 5 are graphs showing one specific example of a local change in the width and depth of the groove of the groove track of the information recording medium of the present invention.
Figure 5:
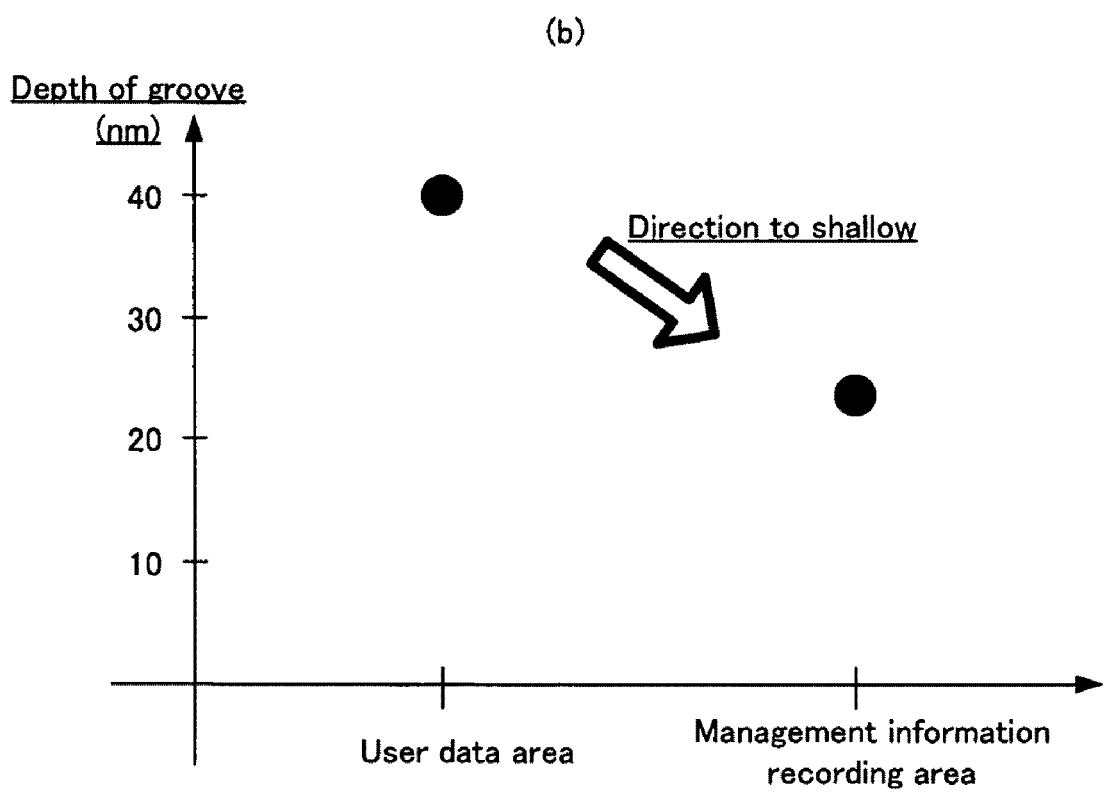

(1-2-3) Groove Shape of Groove Track where Width and/or Depth are Locally Changed Next, with reference to FIG. 5, as the physical structure of the optical disc, for example, corresponding to a reproduction feature based on a push-pull signal, in the embodiment of the information recording medium of the present invention, the groove shape of the groove track where the width and/or depth are locally changed will be explained. FIG. 5 are graphs showing one specific example of a local change in the width and depth of the groove of the groove track of the information recording medium of the present invention.

As shown in FIG. 5, the width and/or depth of the groove of the groove track of the information recording medium of the present invention are locally changed. More specifically, according to a study by the inventors or the like of the present invention, if the width of the groove of the groove track of the user data area 102 is set to approximately "0.16 (μm)", for example, the width of the groove of the groove track of the second management information recording area 20 is preferably set to be relatively narrow. On the other hand, if the depth of the groove of the groove track of the user data area 102 is set to approximately "40 (nm)", for example, the depth of the groove of the groove track of the second management information recording area 20 is preferably set to be relatively shallow, in a range of "20 (nm)" to "30 (nm)", for example.

Incidentally, the groove shape may be formed by combining the local separation along the track direction of the groove track and the local change in width and/or depth.

Figure 6:
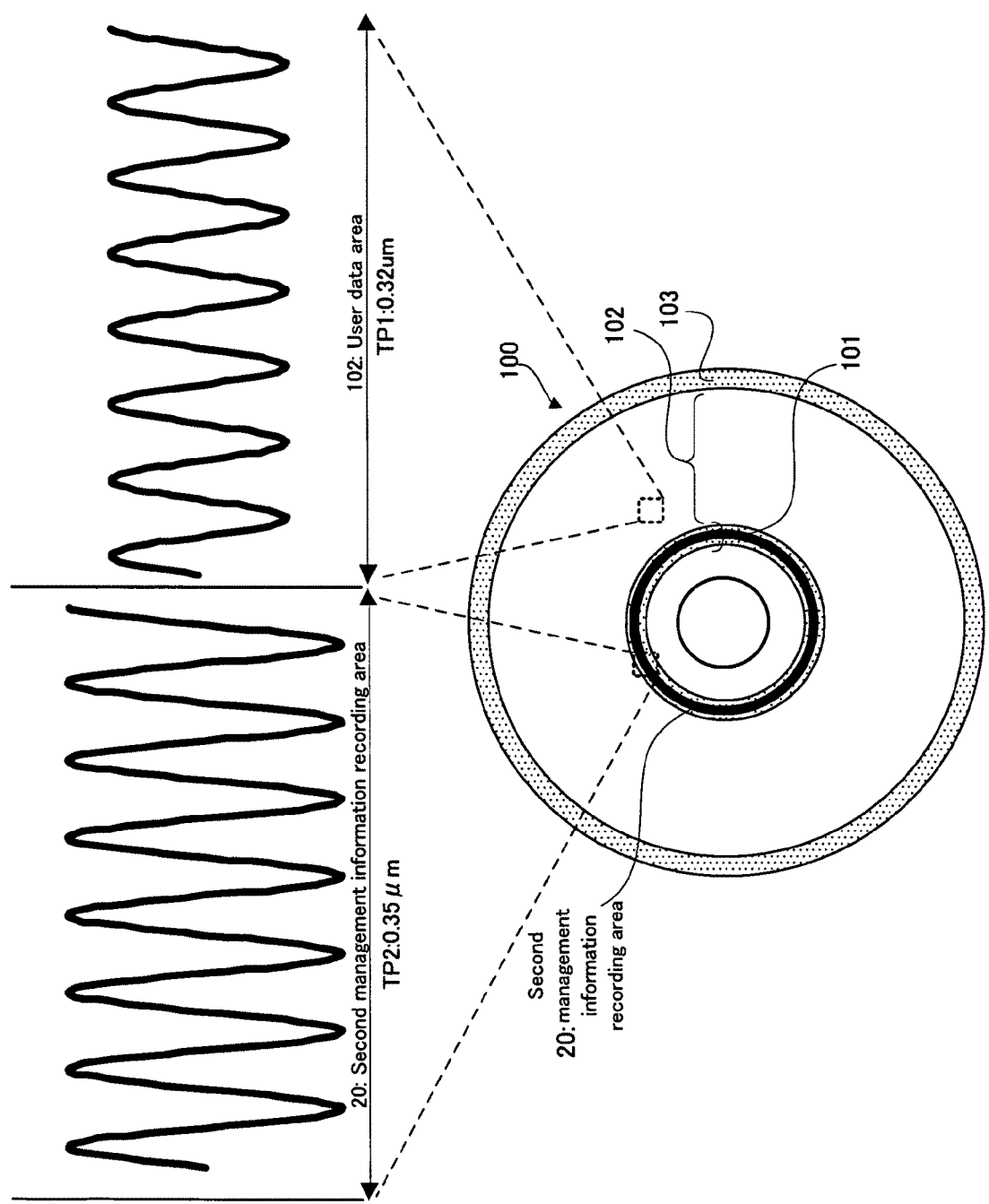
FIG. 6 is a graph schematically showing a push-pull signal, which is one specific example of reproduction features, corresponding to the physical structure, in the optical disc in the first embodiment of the information recording medium of the present invention, and a corresponding schematic plan view.
Figure 7:
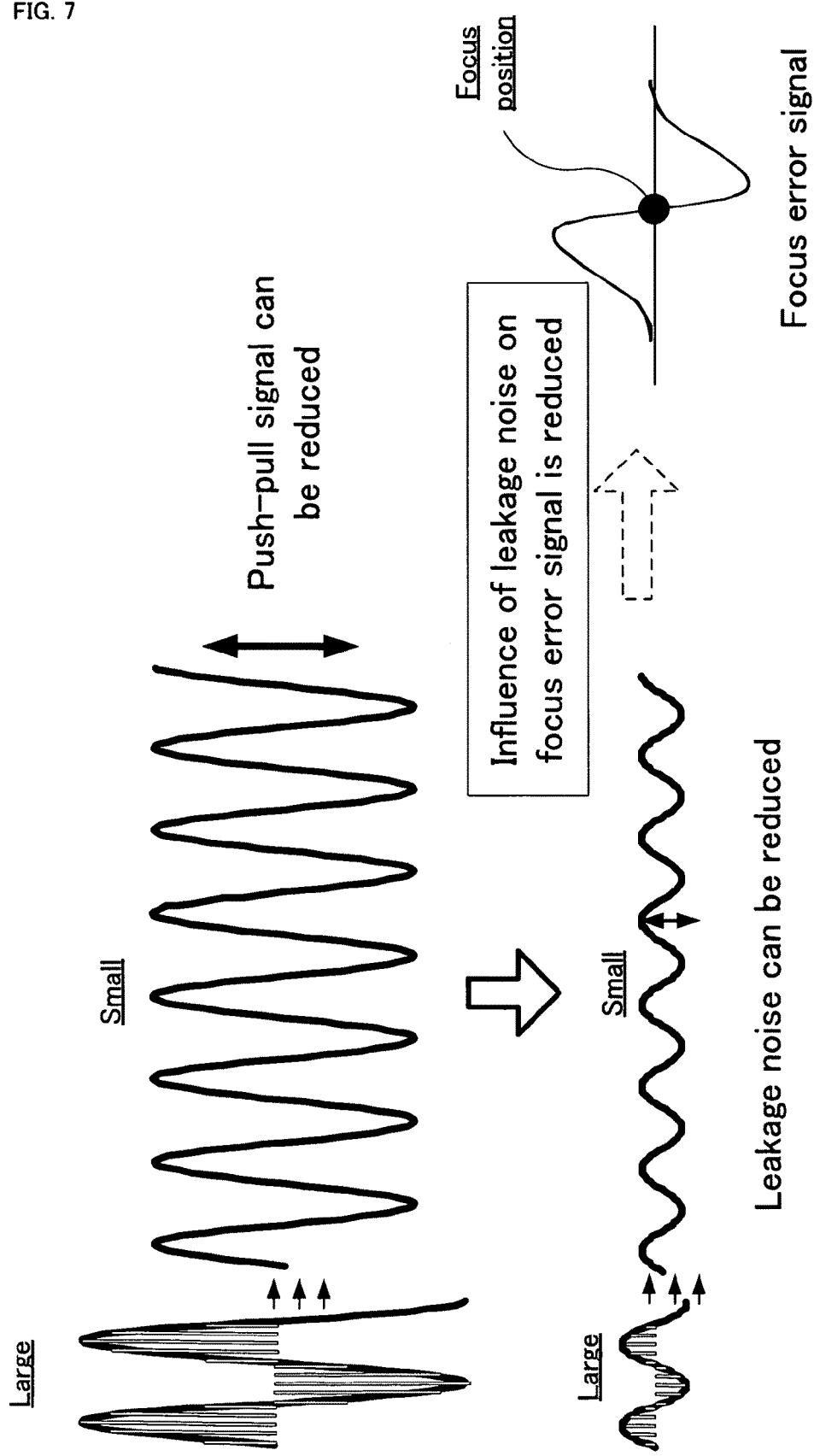
FIG. 7 is a conceptual view showing a relationship between a focus error signal and the push-pull signal corresponding to the physical structure, in the optical disc in the first embodiment of the information recording medium of the present invention.
Figure 8:
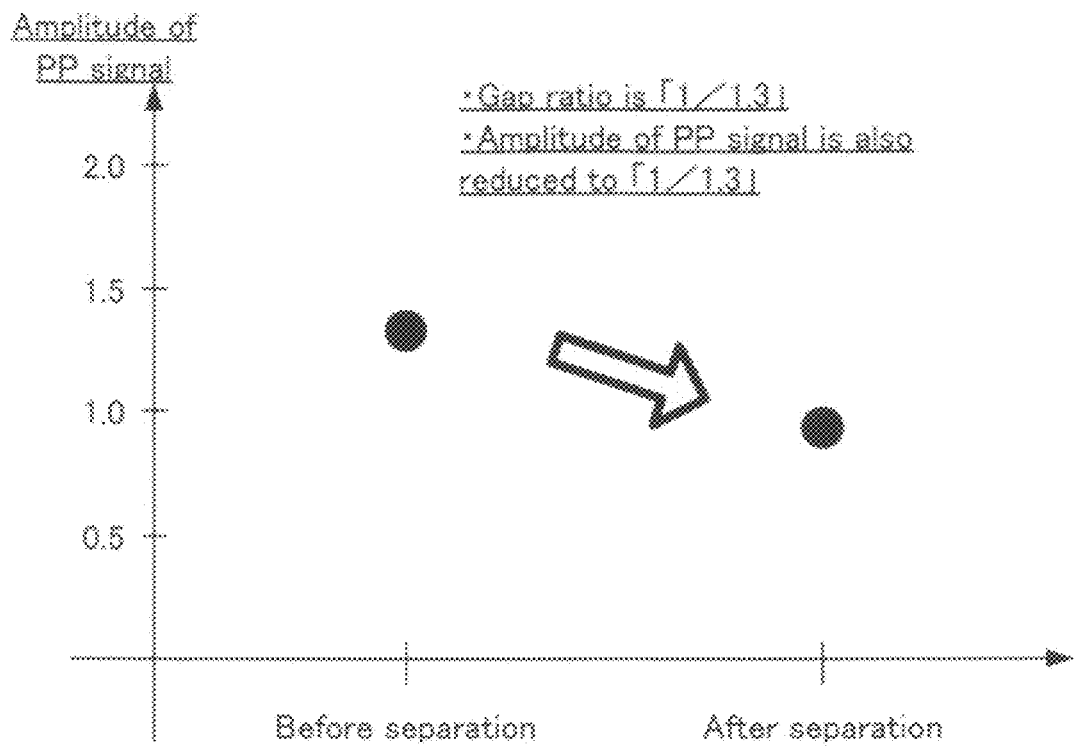
FIG. 8 are a graph (FIG. 8(a)) showing one example of an amplitude of the push-pull signal which is a parameter for determining a predetermined gap ratio of value in the present invention, and a schematic diagram (FIG. 8(b)) showing the ratio of the groove and the gap corresponding to one example of the predetermined gap ratio.
Figure 8:
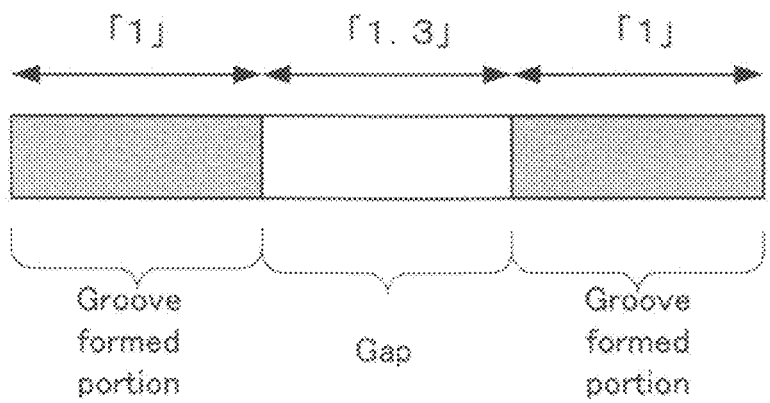

(1-2-4) Examination of Operation and Effect with Regard to the Locally Different Groove Shape of Groove Track Next, with reference to FIG. 6 to FIG. 8, as the physical structure of the optical disc, for example, corresponding to a reproduction feature based on a push-pull signal, in the embodiment of the information recording medium of the present invention, an operation and an effect with regard to the locally different groove shape of the groove track will be examined. FIG. 6 is a graph schematically showing a push-pull signal, which is one specific example of reproduction features, corresponding to the physical structure, in the optical disc in the first embodiment of the information recording medium of the present invention, and a corresponding schematic plan view. FIG. 7 is a conceptual view showing a relationship between a focus error signal and the push-pull signal corresponding to the physical structure, in the optical disc in the first embodiment of the information recording medium of the present invention.

Next, as shown in the signal waveform diagram in FIG. 6, in the optical disc in the embodiment of the information recording medium of the present invention, a push-pull signal read from the user data area 102 is different from a push-pull signal read from the second management information recording area 20, and the amplitude of the push-pull signal read from the second management information recording area 20 is relatively larger than the amplitude of the push-pull signal read from the user data area 102.

In particular, on the optical disc in the embodiment of the information recording medium of the present invention, as shown in the above-mentioned FIG. 4, the groove track formed in the second management information recording area 20 is separated in the predetermined gap ratio along the track direction. Alternatively, as shown in the above-mentioned FIG. 5, the width and/or depth of the groove of the groove track of the information recording medium of the present invention are locally changed. Therefore, the groove track formed in the second management information recording area 20 has a different groove shape of the groove track formed in the user data area 102.

As a result, as shown in the signal waveform diagram on the upper left side of FIG. 7, it is possible to reduce the amplitude of the push-pull signal read from the second management information recording area 20, as compared to an amplitude of the push-pull signal read from the second management information recording area 20 in the case where the groove track is not separated. Incidentally, the signal waveform diagram on the most left side of FIG. 7 shows that the amplitude of the push-pull signal (PP signal) and the amplitude of a leakage noise, described later, are separated along the time axis direction.

Now, with reference to FIG. 8, a specific example of the "predetermined gap ratio" is explained, and the operation and effect thereof are further examined. FIG. 8 are a graph (FIG. 8(a)) showing one example of an amplitude of the push-pull signal which is a parameter for determining a predetermined gap ratio of value in the present invention, and a schematic diagram (FIG. 8(b)) showing the ratio of the groove and the gap corresponding to one example of the predetermined gap ratio.

In particular, as the specific example of the "predetermined gap ratio", it may be defined by the following equation (1).

$$\text{Predetermine gap ratio} = (\text{amplitude of PP signal after separation})/(\text{amplitude of PP signal before separation}) \quad (1)$$

Incidentally, the PP signal indicates the push-pull signal.

Specifically, as shown in FIG. 8(a), it is considered under the assumption that the amplitude of the push-pull signal obtained from the second management information recording area 20 with a track pitch of 0.35 μm is "1.3" times as large as the amplitude of the push-pull signal obtained from the user data area 102 with a track pitch of 0.32 μm. In this case, as shown in FIG. 8(b), if the "predetermined gap ratio", which is a ratio between the length of the groove formed portion and the length of the space (here, a ratio between (i) the length of the groove formed portion and (ii) the sum of the length of the groove formed portion and the length of the space) is set to "1/1.3", it is possible to substantially equalize (i) the amplitude of the push-pull signal obtained from the second management information recording area and (ii) the amplitude of the push-pull signal obtained from the user data area. The specific value of the gap ratio may be determined so as to obtain the push-pull signal with a predetermined amplitude, as described later. Namely, the adjustment of the gap ratio may be performed so as to obtain a desired push-pull signal, individually and specifically, with the gap ratio changed experimentally, experientially, or theoretically, or by simulation or the like. In addition, the gap ratio may be determined on the basis of the NA (Numerical Aperture) of a reproduction optical system, such as an objective lens or the like of the optical pickup, for example, and on the basis of the wavelength of the laser light.

As a result, on a drive circuit for driving an actuator to displace an objective lens in a focusing direction and in a tracking direction, for example, it is possible to reduce an influence on the focus control, such as astigmatism, which is caused by a leakage noise (refer to the lower left side of FIG. 7) caused by the push-pull signal with a less amplitude obtained from the second information recording area, and it is possible to almost or completely eliminate the adverse influence. Therefore, on the information reproducing apparatus described later, it is possible to perform various auto control including the focus control and the tracking control, more highly accurately, and it is possible to realize more highly accurate information reproduction.

(2) Information Reproducing Apparatus

Figure 9:
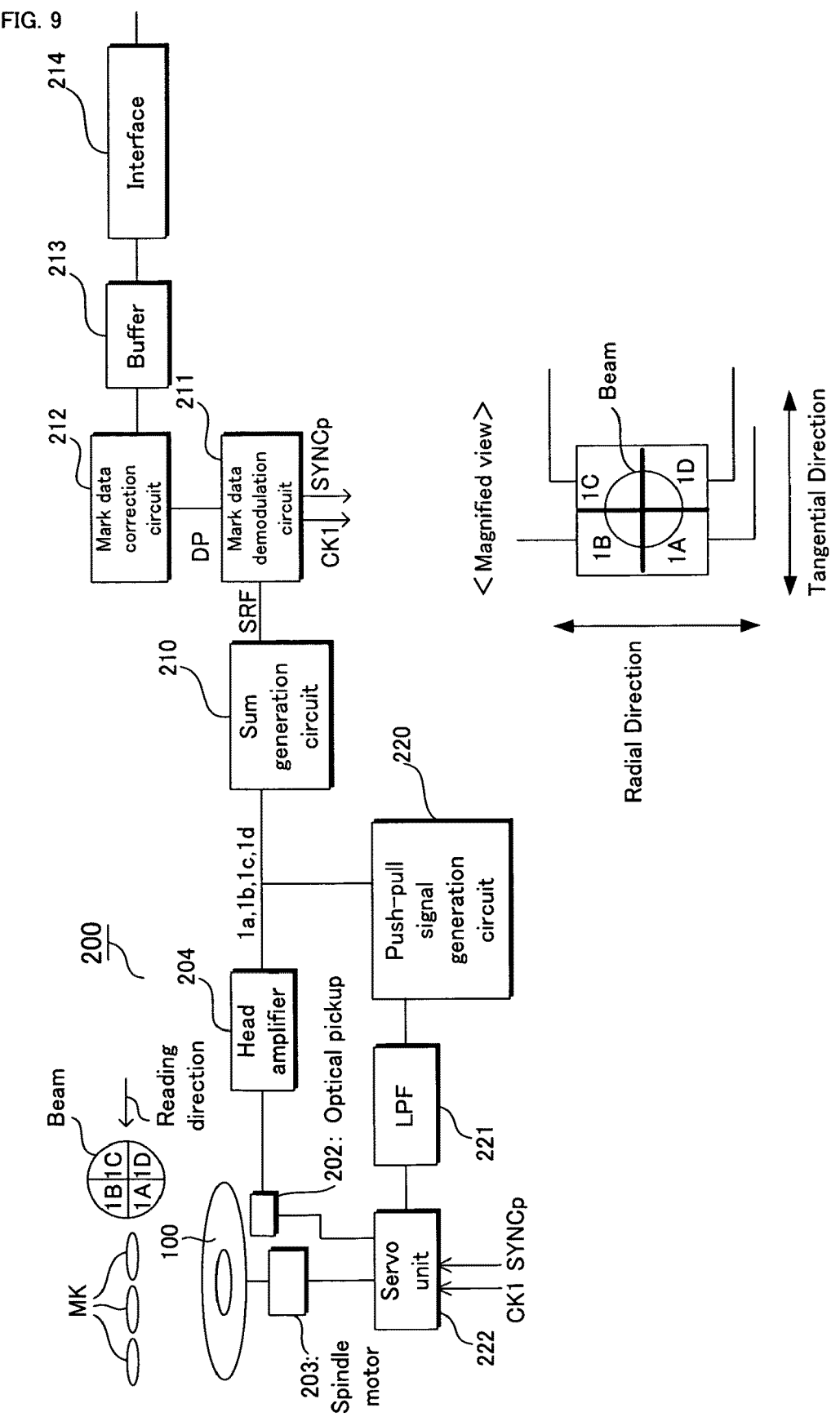
FIG. 9 is a block diagram showing the entire structure of an information reproducing apparatus 200 in an embodiment of the information reproducing apparatus of the present invention.

Next, with reference to FIG. 9, an embodiment of the information reproducing apparatus of the present invention will be discussed. Particularly, the embodiment is an example in which the information reproducing apparatus of the present invention is applied to an information reproducing apparatus for the optical disc.

(2-1) Basic Structure

At first, with reference to FIG. 9, the basic structure of an information reproducing apparatus 200 in the embodiment of the information reproducing apparatus of the present invention will be discussed. FIG. 9 is a block diagram showing the entire structure of the information reproducing apparatus 200 in the embodiment of the information reproducing apparatus of the present invention.

The information reproducing apparatus 200 is provided with: the optical disc 100; an optical pickup 202; a spindle motor 203; a head amplifier 204; a sum generation circuit 210; a mark data demodulation circuit 211; a mark data correction circuit 212; a buffer 213; an interface 214; a push-pull signal generation circuit 220; a low pass filter 221; and a servo unit 222.

On the optical disc 100, mark data DP synchronized with a first clock signal CK1 is recorded by the length of a record mark MK. The first clock signal CK1 of a RF reproduction signal component is a signal which can be generated by the information reproducing apparatus 200 from the RF reproduction signal component of the optical disc 100 which varies in an almost constant cycle, in accordance with the wobbling or the like, as explained in various embodiment of the optical disc 100 described above. In the embodiment, the first clock signal CK1 is generated by the mark data demodulation circuit 211. Incidentally, in the embodiment, the record mark MK can be interpreted as a pit, and the track is constructed from this pit row.

More specifically, the information reproducing apparatus 200 is provided with: the optical pickup 202 for irradiating the optical disc 100 with a reproduction beam and outputting a signal in respond to reflected light; the spindle motor 203 for controlling the rotation of the optical disc 100; and the servo unit 222. The first clock signal CK1 and a mark synchronization signal SYNCp are supplied to the servo unit 222. The servo unit 222 is synchronized with these signals, and performs spindle servo for controlling the rotation of the spindle motor 203, and focus servo and tracking servo for performing relative position control of the optical pickup 202 to the optical disc 100.

The optical pickup 202 is provided with a laser diode for irradiating the reproduction beam; and a not-illustrated four-division detection circuit. The four-division detection circuit divides the reflected light of the reproduction beam into four areas 1A, 1B, 1C, and 1D shown in the upper part of FIG. 6, and outputs each signal corresponding to the quantity of light in respective one of the areas. The head amplifier 204 amplifies each output signal of the optical pickup 202, and outputs a divisional read signal 1a corresponding to the area 1A, a divisional read signal 1b corresponding to the area 1B, a divisional read signal 1c corresponding to the area 1C, and a divisional read signal 1d corresponding to the area 1D.

The sum generation circuit 210 is provided with an addition circuit for adding the divisional read signals 1a, 1b, 1c, and 1d and for outputting a sum read signal SRF. Incidentally, the sum read signal SRF is a signal which represents the length of the record mark.

The mark data demodulation circuit 211 reproduces the mark data DP on the basis of the sum read signal SRF, and generates the first clock signal CK1. More specifically, the mark data demodulation circuit 211 demodulates the reproduced mark data DP by using a predetermined table, with the mark synchronization signal SYNCp as a reference position, to thereby generate reproduction data. For example, if RLL (1, 7) modulation, i.e. Run Length Limited (1, 7) modulation, is adopted as a modulating method, a process of converting 3-bit mark data DP to 2-bit reproduction data is performed. Then, a descramble process is performed in which the order of the reproduction data is rearranged in accordance with a predetermined rule, and the processed reproduction data is outputted.

The reproduction data obtained in this manner is supplied to the mark data correction circuit 212, on which an error correction process and an interpolation process are performed, and then, it is stored into the buffer 213. The interface 214 sequentially reads the data stored in the buffer 213, converts it in a predetermined output format, and outputs it to external equipment.

The push-pull signal generation circuit 220 calculates $(1a+1d)-(1b+1c)$ and generates a push-pull signal. The component $(1a+1d)$ corresponds to the areas 1A and 1D which are on the left side with respect to the reading direction, while the component $(1b+1c)$ corresponds to the areas 1B and 1C which are on the right side with respect to the reading direction. The value of the push-pull signal indicates a relative position relationship between the reproduction beam and the track. Specifically on the push-pull signal generation circuit 220, a standardized push-pull signal value (or a standardized push-pull value) is a signal calculated as the following equation (1), $$\text{the standardized push-pull signal value} = \{(1a+1d)-(1b+1c)\}/(1a+1b+1c+1d) \quad (1)$$

As shown in the equation (1), the standardized push-pull signal value is calculated based on the quotient which is output of a division circuit and is obtained by dividing a push-pull signal by the sum of the divisional signals. Based on that the output of such an operation circuit is used as the push-pull signal, a stable push-pull signal can be obtained in which a variation in the absolute value of the push-pull signal caused by a local reflectance change before or after the recording of the user data (in other word, in unrecorded state or in recorded state) is corrected. Incidentally the push-pull signal value PP described above is the signal amplitude (peak-to-peak value) of the low pass filter output of a signal with $(1a+1d)-(1b+1c)$. Alternatively, the standardized push-pull signal value NPP is the signal amplitude (peak-to-peak value) of the low pass filter output of a signal with $\{(1a+1d)-(1b+1c)\}/(1a+1b+1c+1d)$. Incidentally as shown on the lower part of FIG. 9, a radial direction is indicated along a direction along area 1A and area 1B. And a tangential direction is indicated along a direction along area 1C and area 1D.

The push-pull signal is outputted to the servo unit 222 through the low pass filter 221. The servo unit 222 performs the tracking control on the basis of the push-pull signal.

(3) Manufacturing Apparatus of Information Recording Medium (Mastering Apparatus)

Next, with reference to FIG. 10 to FIG. 12, an embodiment of the manufacturing apparatus for manufacturing the information recording medium of the present invention will be explained in detail. Particularly, in the embodiment, the embodiment of the manufacturing apparatus of the information recording medium of the present invention is applied to a mastering apparatus for the optical disc.

(3-1) Entire Structure

At first, with reference to FIG. 10, the entire structure of the mastering apparatus in the embodiment of the manufacturing apparatus of the present invention will be discussed. FIG. 10 is a block diagram showing the entire structure of the mastering apparatus in the embodiment of the manufacturing apparatus of the present invention.

Figure 10:
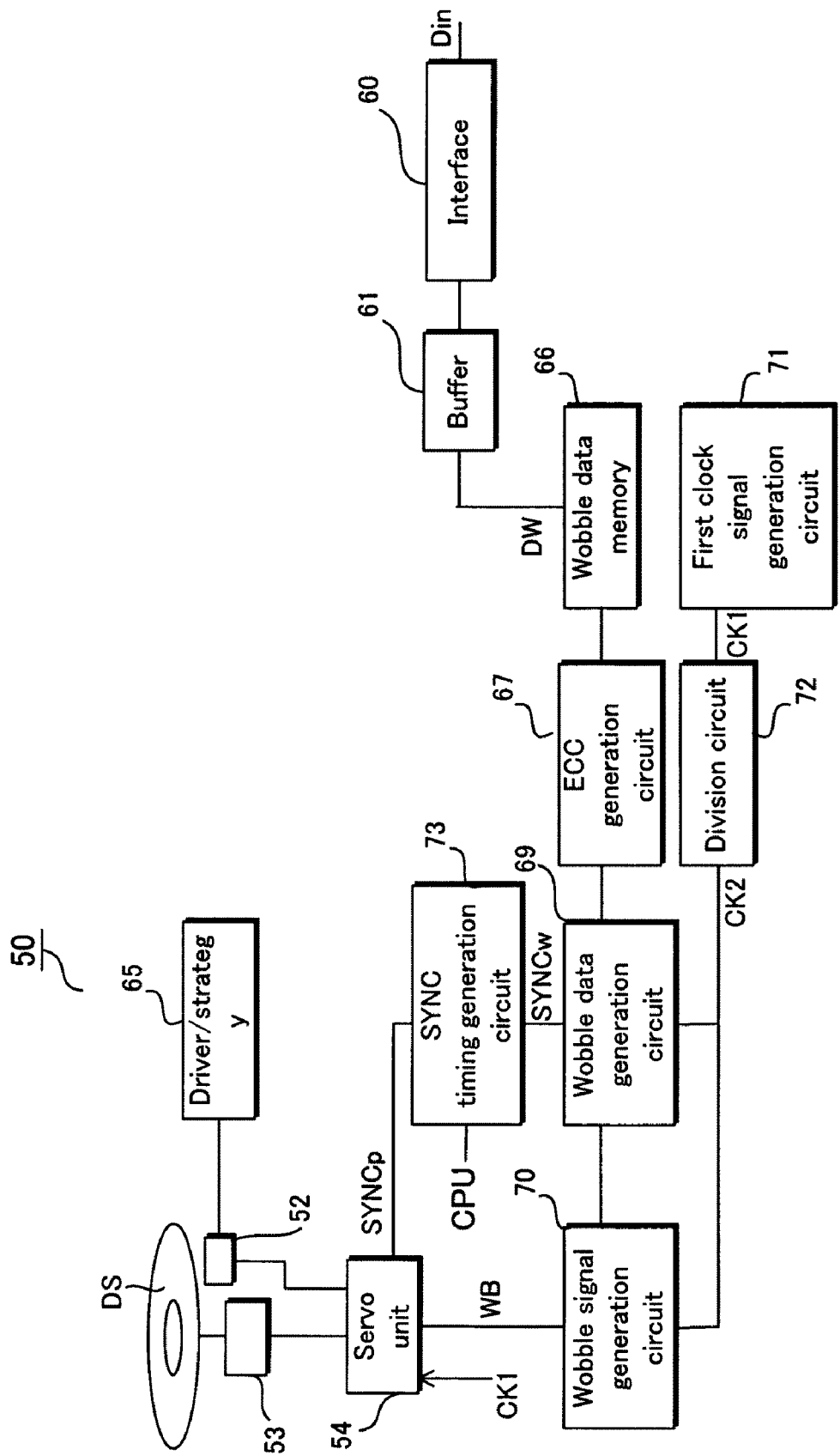
FIG. 10 is a block diagram showing the entire structure of a mastering apparatus in an embodiment of the manufacturing apparatus of the present invention.

As shown in FIG. 10, a mastering apparatus 50 is an apparatus for preparing a master disc DS, and is provided with: a recording unit 52; a spindle motor 53 for rotating the master disc DS; and a servo unit 54. The master disc DS is constructed as a glass master or glass plate on which photoresist is applied, for example. The recording unit 52 is provided with: a laser apparatus for irradiating laser light; an optical system for focusing the laser light on the master disc DS; and a slider apparatus for displacing the laser light apparatus and the optical system in one body in the radial direction of the master disc DS. The laser apparatus emits the laser light with a laser power corresponding to a drive signal supplied from a driver 65. The slider apparatus displaces the optical system and the laser apparatus in the radial direction of the master disc DS, in accordance with a control signal from the servo unit 54.

A first clock signal CK1 and a pit synchronization signal SYNCp are supplied to the servo unit 54. The servo unit 54 is synchronized with these signals, and performs spindle servo for controlling the rotation of the spindle motor 53, focus servo for controlling the focus of the laser light, and tracking servo for controlling the slider apparatus. Then, it controls the track pitch. Moreover, the laser light is displaced by a not-illustrated wobble modulator in the radial direction, to thereby form the groove shape.

The first clock signal CK1 is generated by a first clock signal generation circuit 71. Moreover, a division circuit 72 divides the first clock signal CK1, to thereby generate a second clock signal CK2 or the like. The second clock signal CK2 is used for the generation of a wobble signal WB, and is a time reference of the generation.

The explanation is back in FIG. 10. To the master apparatus 50, input data Din is supplied from the exterior equipment. The input data Din is taken into a buffer 61 through an interface 60. Under the control of a CPU (Central Processing Unit), the input data Din taken in the buffer 61 is divided into wobble data DW and each of them is transferred to a wobble data memory 66. Then, the wobble data DW stored in the wobble data memory 66 is read therefrom and supplied to an ECC generation circuit 67, under the control of the CPU. The ECC generation circuit 67 generates an error correction code on the basis of the wobble data DS, and appends this code to the wobble data DW. A wobble data generation circuit 69 appends a wobble synchronization signal SYNCw to the wobble data DW, and then generates data SS.

A wobble signal generation circuit 70 performs predetermined modulation to the data SS, to thereby generate a wobble signal WB. Here, it generates two types of wobble signals corresponding to the respective two types of groove tracks.

(3-2) Manufacturing Procedure

Next, with reference to FIG. 11 and FIG. 12, an explanation will be given for one manufacturing procedure and another manufacturing procedure related to the manufacturing apparatus for manufacturing the information recording medium of the present invention, including a study for the operation and effect thereof.

(3-2-1) One Manufacturing Procedure (Local Separation of Groove Track)

At first, with reference to FIG. 11, as one manufacturing procedure, the local separation of the groove track will be explained. FIG. 11 is a schematic diagram schematically showing one manufacturing procedure on the manufacturing apparatus for manufacturing the information recording medium of the present invention.

Figure 11:
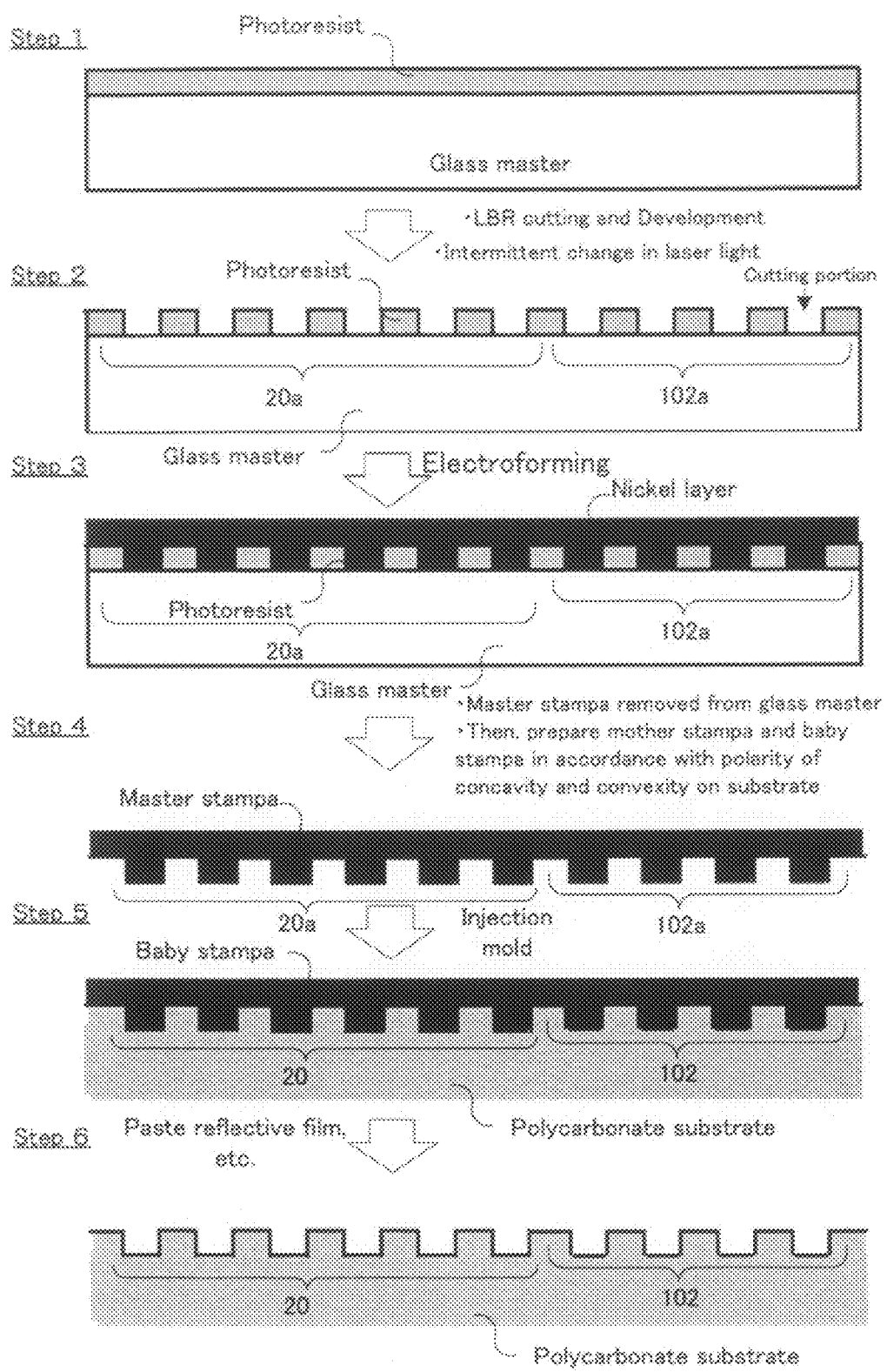
FIG. 11 is a schematic diagram schematically showing one manufacturing procedure on the manufacturing apparatus for manufacturing the information recording medium of the present invention.

As shown in a step 1 in FIG. 11, on the glass mater, viscous photoresist (photosensitive resin) is dropped and applied in a uniform thickness while the glass master is rotated; namely, spin coating is performed.

Then, as shown in a step 2 in FIG. 11, laser light for cutting, such as electron rays and ultraviolet rays, is irradiated with a predetermined laser power, in a portion 102a of the glass master for forming the user data area and in a portion 20a of the glass master for forming the second management information recording area. A portion irradiated with the laser light for cutting in this manner becomes in such a condition that the bond of the photoresist is cut by light energy at the molecular level. Thus, by soaking it in a developing solution, holes appear, and cutting portion are formed in both the portion 20a and the portion 102a. Specifically, the width of the groove can be determined from the beam diameter of the laser light for cutting, in addition to the laser power. Moreover, the depth of the groove can be determined from the thickness of the photoresist in addition to the laser power. Incidentally, it is desirable that the laser power appropriately corresponds to the sensitivity of the photoresist which constitutes the master.

In particular, in the step 2, in order to separate, along the track direction, the groove track of the second management information recording area in the predetermined gap ratio, the irradiation (or an irradiation timing) of the laser light for cutting is intermittently changed in a predetermined cycle corresponding to the gap ratio. Therefore, it is possible to separate the groove track of the second management information recording area of the optical disc, in the predetermined gap ratio, after injection molding in a step 5 described later.

Then, as shown in a step 3 in FIG. 11, nickel is laminated on a thin film of nickel by an electroforming process, and a thick nickel layer is formed on the glass master.

Then, as shown in a step 4 in FIG. 11, the nickel layer is removed from the glass master, to thereby prepare a master stampa. From this master stampa, a mother stampa and a baby stampa are prepared through the same electroforming process. The baby stampa has the same concavity and convexity as those of the master stampa because it passes through the transfer twice.

Then, as shown in a step 5 in FIG. 11, a resin substrate, i.e., a polycarbonate substrate, is prepared from the baby stampa by an injection molding machine. In particular, the portion 20a of the baby stampa is separated along the track direction in the predetermined gap ratio on the basis of the above-mentioned step 2, so that it is possible to separate the groove track of the second management information recording area of the optical disc in the predetermined gap ratio.

Lastly, as shown in a step 6 in FIG. 11, a reflective film is pasted, and a dummy substrate and a substrate for holding a signal surface are pasted, for example, to thereby prepare an optical disc.

(3-2-2) Another Manufacturing Procedure (Local Change in Width and/or Depth of Groove of Groove Track)

Next, with reference to FIG. 12, as another manufacturing procedure, the local change in the width and/or depth of the groove of the groove track will be explained. FIG. 12 is a schematic diagram schematically showing another manufacturing procedure on the manufacturing apparatus for manufacturing the information recording medium of the present invention. Incidentally a fundamental constitution and principle of said another manufacturing procedure is almost same as that of said one manufacturing procedure, so that a explanation of same part would be omitted.

Figure 12:
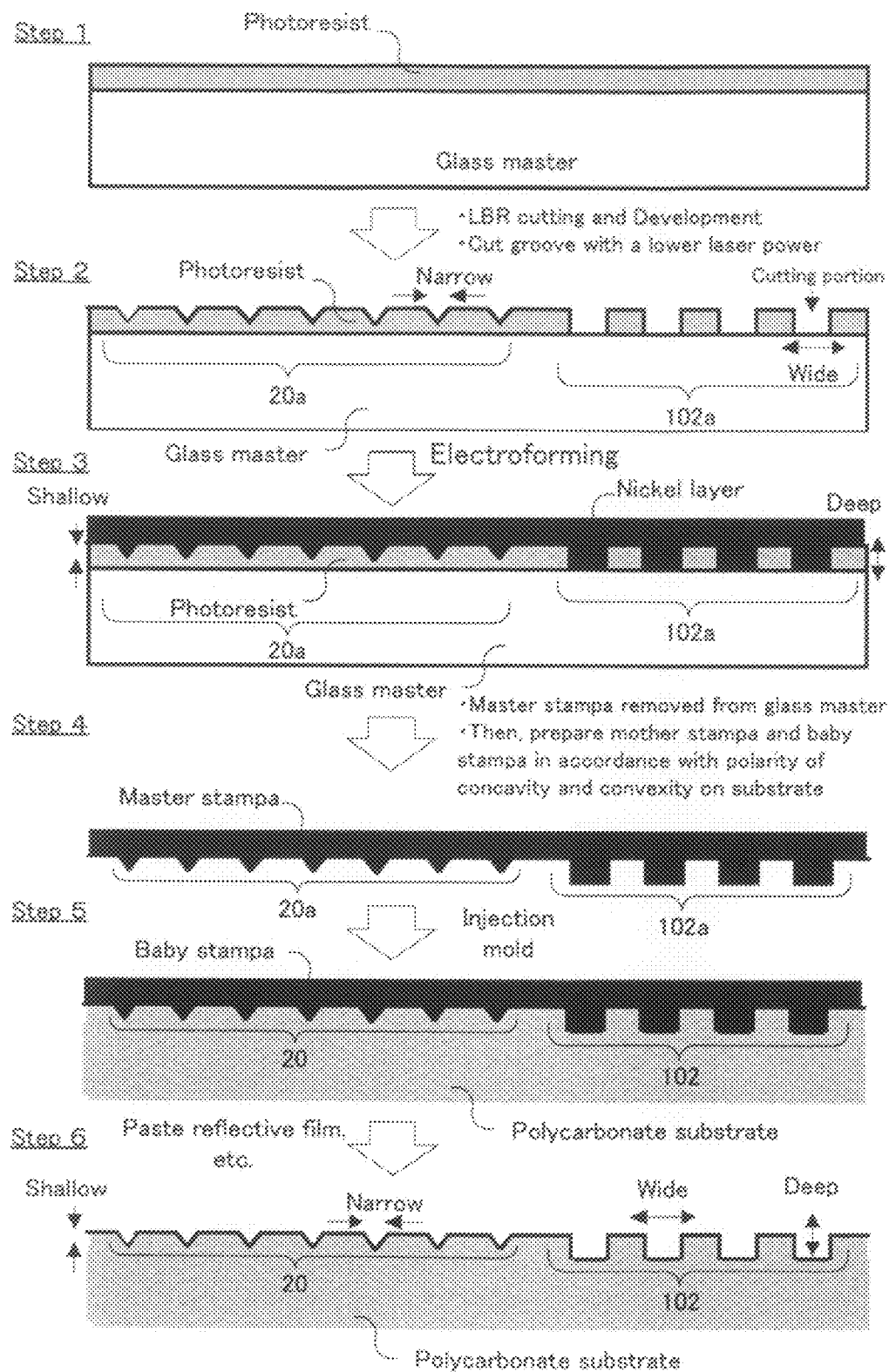
FIG. 12 is a schematic diagram schematically showing another manufacturing procedure on the manufacturing apparatus for manufacturing the information recording medium of the present invention.

As shown in a step 1 in FIG. 12, on the glass mater, viscous photoresist (photosensitive resin) is dropped and applied in a uniform thickness while the glass master is rotated; namely, spin coating is performed.

Then, as shown in a step 2 in FIG. 12, a portion 20a of the glass master for forming the second management information recording area is irradiated with laser light for cutting, such as electron rays and ultraviolet rays, with a relatively lower laser power than a laser power in the case of a portion 102a of the glass master for forming the user data area. A portion irradiated with the laser light for cutting in this manner becomes in such a condition that the bond of the photoresist is cut by light energy at the molecular level. Thus, by soaking it in a developing solution, holes appear, and cutting portion are formed in both the portion 20a and the portion 102a.

As a result, it is possible to make the width of the groove relatively narrow, and the depth relatively shallow, in the portion 20a of the glass master for forming the second management information recording area. Specifically, the width of the groove can be determined from the beam diameter of the laser light for cutting, in addition to the laser power. Moreover, the depth of the groove can be determined from the thickness of the photoresist in addition to the laser power. Incidentally, it is desirable that the laser power appropriately corresponds to the sensitivity of the photoresist which constitutes the master.

Then, as shown in a step 3 in FIG. 12, nickel is laminated on a thin film of nickel by an electroforming process, and a thick nickel layer is formed on the glass master.

Then, as shown in a step 4 in FIG. 12, the nickel layer is removed from the glass master, to thereby prepare a master stampa. From this master stampa, a mother stampa and a baby stampa are prepared through the same electroforming process. The baby stampa has the same concavity and convexity as those of the master stampa because it passes through the transfer twice.

Then, as shown in a step 5 in FIG. 12, a resin substrate, i.e., a polycarbonate substrate, is prepared from the baby stampa by an injection molding machine.

Lastly, as shown in a step 6 in FIG. 12, a reflective film is pasted, and a dummy substrate and a substrate for holding a signal surface are pasted, for example, to thereby prepare an optical disc.

As a result of the above-mentioned another manufacturing procedure, it is possible to locally change the width and/or depth of the groove in the groove shape of the groove track of the information recording medium of the present invention. In other words, it is possible to relatively narrow the width of the groove of the groove track of the second management information recording area 20 in the information recording medium of the present invention, as compared to the width of the groove of the groove track of the user data area 102. In addition, it is possible to relatively shallow the depth of the groove of the groove track of the second management information recording area 20 in the information recording medium of the present invention, as compared to the depth of the groove of the groove track of the user data area 102. As a result, in the another manufacturing procedure related to the manufacturing apparatus of the information recording medium of the present invention, the glass master is irradiated with the laser light for cutting, with a locally different laser power, so that it is possible to locally change the width and/or depth of the groove in the groove shape of the groove track of the information recording medium of the present invention.

Incidentally, in the above-mentioned one manufacturing procedure, at least one of the width and depth of the groove in the groove shape of the groove track of the information recording medium of the present invention is uniformed by irradiating the glass master with the laser light for cutting with a uniform laser power. However, it may be combined with the above-mentioned another manufacturing procedure. For example, in the step 2 in FIG. 11 showing the one manufacturing procedure, the portion 20a of the glass master for forming the second management information recording area may be irradiated with the laser light for cutting, such as electron rays and ultraviolet rays, for example, with a relatively lower laser power than a laser power in the case of a portion 102a of the glass master for forming the user data area. Therefore, it is also possible to locally change the width and/or depth of the groove in the groove shape of the groove track while the groove track is separated, along the track direction, on the information recording medium of the present invention. In other words, it is also possible to relatively narrow the width of the groove of the groove track while the groove track is separated, along the track direction, in the second management information recording area 20 on the information recording medium of the present invention, as compared to the width of the groove of the groove track in the user data area 102. In addition, it is also possible to relatively shallow the depth of the groove of the groove track while the groove track is separated in the second management information recording area 20 on the information recording medium of the present invention, as compared to the depth of the groove of the groove track in the user data area 102.

Now, the recording layer 207, which constitutes the information recording medium shown in FIG. 3, is formed in the step 6 onto the substrate formed in the step 5 from the stampa manufactured in the above-mentioned procedure.

As the information recording medium which uses the recording layer 207 of an irreversible change recording type shown in FIG. 3, a CD-R and a DVD-R are already widely used and also have actual results, so that the recording layer by a similar recording mechanism or similar way of recording is preferably applied even in the information recording medium of the present invention aiming at a higher-density information medium. The CD-R and the DVD-R uses recording layer material with high transparency with respect to a wavelength of a recording/reproducing light, and uses a phase difference change in a recording portion, to thereby generate a change in intensity of reflected light. So in the information recording medium accompanied by the phase change in a recording portion, the push-pull signal value or the standardized push-pull signal value may greatly change between before and after the recording (in other word, in unrecorded state and in recorded state), and the push-pull signal value or the standardized push-pull signal value in recorded state may decrease after the recording in some cases. In the CD-R and the DVD-R, a ratio of a standardized push-pull signal value NPPa after the recording to a standardized push-pull value NPPb before the recording, NPPa/NPPb, is approximately from 0.5 to 0.8.

Particularly in such a information recording medium, it is rather preferable that a standardized push-pull value NPPa1 in the first information recording area after the recording and a standardized push-pull value NPPb2 in the second information recording area in unrecorded state before recording have a similar value, and that the standardized push-pull value is uniform in the first and second information recording areas, in reading the data after the recording. Randomly accessing the unrecorded user data area (e.g., in the first information recording area) is actually rare case, and in most cases, recording is performed in order from the inner circumference to the outer circumference. Alternatively, randomly accessing a particular address in the first information recording area across the second information recording area is in most cases that the user data exists in the first information recording area, in other word, cases that the first information recording area is in recorded state. That is, it is preferable that NPPa1 and NPPb2 are substantially equal. The expression "substantially equal" of the embodiment here indicates that a variation amount of the NPPa1 and the NPPb2 is within ±6 dB, in other word, the ratio (ratio value) of "NPPa1/NPPb2" is in a range of "0.5" to "2.0". In this range, the signal amplitude of an input signal to the push-pull signal generation circuit 220, the low pass filter 221, and the servo unit 222 or the like is substantially constant, regardless of the position of the information recording area, so that an operation of changing a gain or the like is unnecessary, and the circuits and the servo operation are simplified, which is preferable. Moreover, if the variation amount of the NPPa1 and the NPPb2 is within ±3 dB, in other word, the ratio of "NPPa1/NPPb2" is in a range of "0.707" to "1.42", there is sufficient capacity with respect to the variance for control of operation of each constitutional element described above, which allows a more preferable servo operation.

As described above, in the information recording medium in which the track pitch of the second track is set to be wider than that of the first track in the first information recording area in order to improve an ability to reproduce management information data which is designed only for reproduction and recorded in the second track based on the wobbling in the second information recording area, if the groove shape (or the shape of the groove) is the same, usually "NPPb2>NPPb1" (i.e., "NPPb2" is grater than "NPPb1") in addition to "NPPb1>NPPa1". Therefore, in order to make NPPa1 and NPPb2 substantially equal, obviously, it is necessary to exist a condition that "NPPb2<NPPb1".

In order to realize "NPPb2<NPPb1", particularly, it is necessary to set at least one of the groove width and the groove depth of the second track to be sufficiently smaller (shallower) than the groove width or the groove depth of the first track. In the example explained by using FIG. 5 in said section "(1-2-3) Groove Shape of Groove Track Where Width and/or Depth Are Locally Changed", if the track pitches of the first and second track are respectively 0.32 μm and 0.35 μm and the groove width is 0.16 μm, an example in which the groove depth of the first track is about "40(nm)" and the groove depth of the second track is about "20(nm)" to "30(nm)" corresponds to an example which satisfy the condition "NPPb2<NPPb1" as described above.

More specially, the groove depth of the first track of the first information recording area in which the groove width is about 0.17 (μm) is set to about 40(nm). And the groove depth of the second track of the second information recording area in which the groove width is about 0.17 (μm) is set to about 23(nm). Owing to realize the groove shape, as shown in a step 1 in FIG. 12, the thickness of the viscous photoresist on the glass mater formed by the spin coating is set to be about "40(nm)" to "45(nm)". Incidentally and normally the thickness of the photoresist is set to be almost same as the groove depth of the first track of the first information recording area or to be thicker by 10% to 20% than the groove depth of the first track. And owing to realize the groove shape, as shown in a step 2 in FIG. 12, a ratio of the laser power for cutting of the second track to the laser power of the first track is set to be about "2" to "3" (i.e., "2:3").

Lastly, as shown in a step 6 in FIG. 12, (i) an Ag (argentum) alloy reflective film, which thickness is "50(nm)", (ii) the recording layer, which is phase-changed in the recording of the data and which thickness is "30(nm)", and (iii) protective layer characterized optical transparency which thickness is "100($\mu$m)", are pasted from this order on the substrate in which the groove shape described above is formed. And the information recording medium in which the ratio of "NPPa1/NPPb1" is in a range of "0.5" to "0.7", is recorded or reproduced from the side of the protective layer characterized optical transparency by the optical system based on "0.85" of the NA (Numerical Aperture) and "405(nm)" of the wavelength of the laser light. In this case, the value of NPPb1 became in a range of "0.5" to "0.6", the value of NPPa1 became in a range of "0.25" to "0.42" and the value of NPPb2 became in a range of "0.3" to "0.4".

(3) Second Embodiment of Information Recording Medium of Present Invention

Next, a second embodiment of the information recording medium of the present invention will be discussed.

(3-1) Management Information

Figure 13:
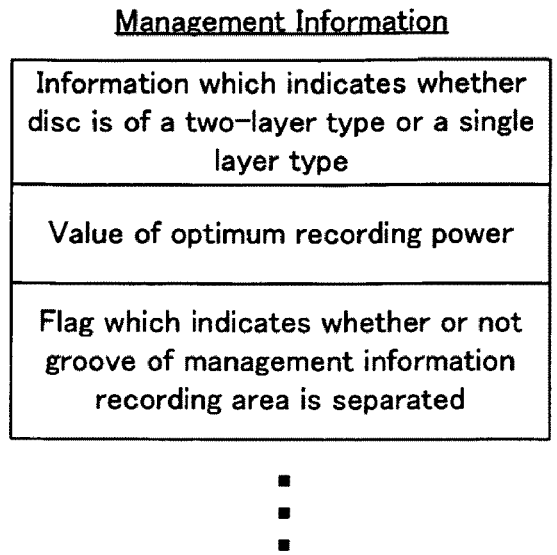
FIG. 13 is a table showing management information including identification information (flag) or the like which indicates whether or not the groove of the groove track formed in a management information recording area is divided, in a second embodiment of the information recording medium of the present invention.

With reference to FIG. 13, one specific example of the management information in the second embodiment of the information recording medium of the present invention will be discussed. FIG. 13 is a table showing the management information including identification information (flag) or the like which indicates whether or not the groove of the groove track formed in the second management information recording area is separated (or cut), in the second embodiment of the information recording medium of the present invention.

As shown in FIG. 13, the management information recorded in the second management information recording area, for example, may include (i) information which indicates whether the optical disc is of a two-layer type or a single layer type, (ii) the value of an optimum recording power for the recording layer of the optical disc, and (iii) the identification information (flag) which indicates whether or not the groove of the groove track is separated in the second management information recording area. In addition, the identification information may indicate whether or not the width and/or depth of the groove in the groove shape of the groove track are locally changed.

Moreover, in addition, in the above-mentioned judgment information recording area, i.e. the BCA (Burst Cutting Area), in which information can be read without relying on the tracking servo, the identification information may be recorded in advance, in addition to or included in the judgment information which indicates various attributes of the optical disc.

As a result, the information reproducing apparatus, such as a BD player, can quickly and accurately judge whether or not the groove of the groove track is separated in the second management information recording area of the information recording medium which is a reproduction target, and it can quickly and accurately reproduce the information on the information recording medium.

(3-2) Reproducing Method

Figure 14:
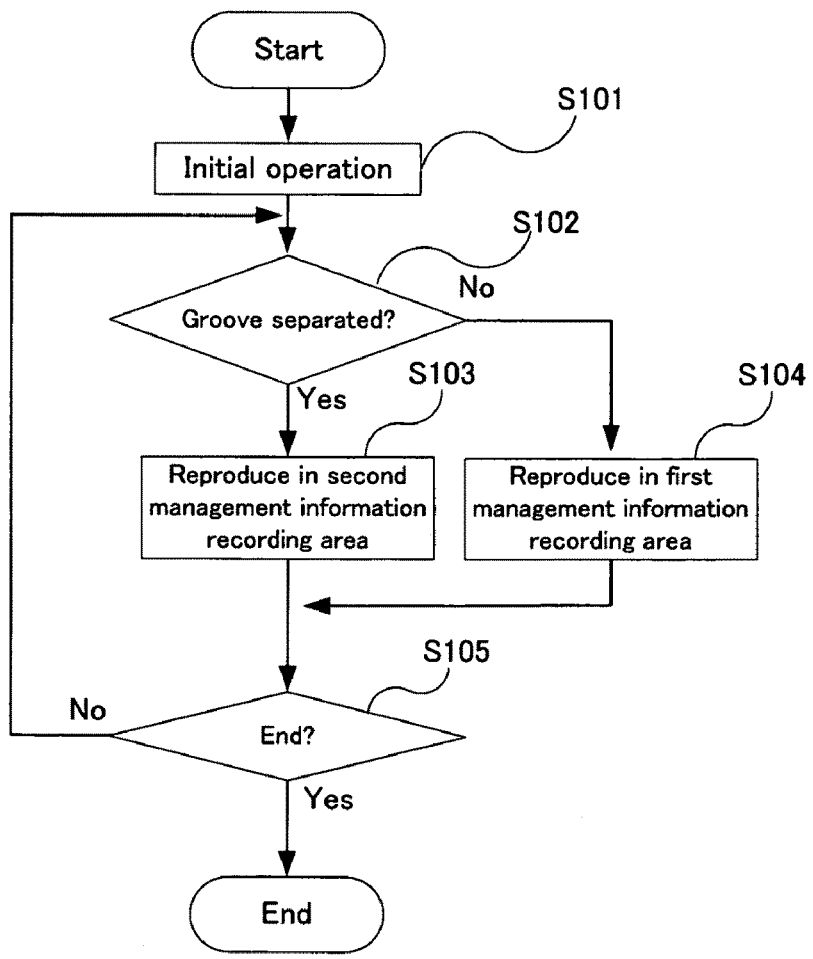
FIG. 14 is a flowchart showing one specific example of a reproducing method for the information recording medium of the present invention.

Next, with reference to FIG. 14, a reproducing method for the second embodiment of the information recording medium of the present invention will be discussed. FIG. 14 is a flowchart showing one specific example of the reproducing method for the information recording medium of the present invention.

As shown in FIG. 14, if the optical disc is loaded or inserted, the various management information, which is recorded in advance in the BCA, for example, is obtained by the reading device, such as the optical pickup, as an initial operation, under the control of the controlling device, such as the CPU (step S101).

Then, it is judged whether or not the groove of the groove track formed in the second management information recording area, for example, is separated, on the basis of the identification information (flag) included in the obtained management information, under the control of the controlling device, such as the CPU (step S102). In addition, the identification information may allow the judgment of whether or not the width and/or depth of the groove in the groove shape of the groove track are locally changed. Here, if the groove of the groove track formed in the second management information recording area is separated (the step S102: Yes), the information recorded in advance in the second management information recording area is reproduced, and the various management information is obtained (step S103).

On the other hand, if the groove of the groove track formed in the second management information recording area is not separated (the step S102: No), the information recorded in advance in the first management information recording area with the same track pitch as the user data area is reproduced, and the various management information is obtained (step S104). As described above, by recording all or part of the various management information in advance with it dispersed in the plurality of management information recording areas (e.g., the first management information recording area and the second management information recording area) and with high redundancy, it is possible to realize more assured and quick reading of the management information.

Then, it is judged whether or not the reproduction operation is ended, under the control of the CPU or the like (step S105). Here, if the reproduction operation is ended (the step S105: Yes), a series of operations is ended. On the other hand, if the reproduction operation is not ended (the step S105: No), again, it may be judged whether or not the groove of the groove track formed in the second management information recording area is separated (the step S102).

(5) Third Embodiment of Information Recording Medium of Present Invention

Figure 15:
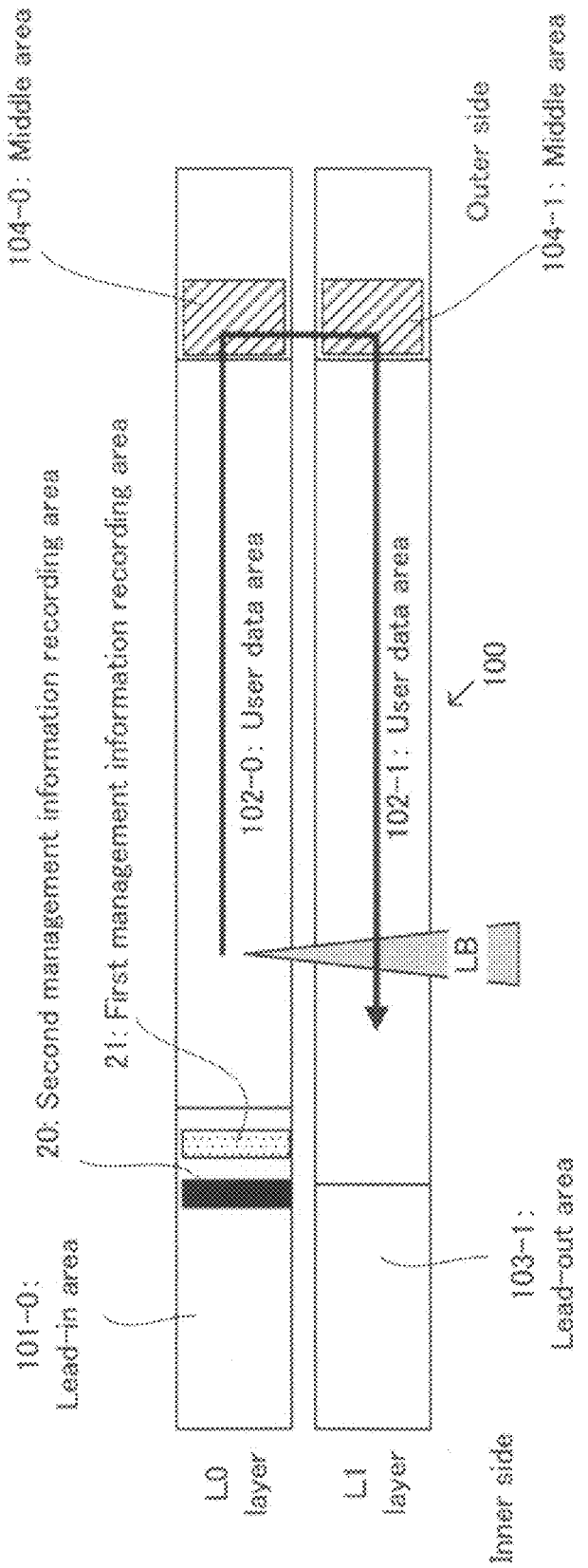
FIG. 15 is a conceptual view schematically showing the structure of a recording area in the radial direction of an optical disc in a third embodiment of the information recording medium of the present invention.

Next, with reference to FIG. 15, a third embodiment of the information recording medium of the present invention will be discussed. FIG. 15 is a conceptual view schematically showing the structure of the recording area in the radial direction of the optical disc in the third embodiment of the information recording medium of the present invention.

As shown in FIG. 13, an optical disc 100 in the third embodiment has such a structure that two recording layers, i.e. an L0 layer and an L1 layer, are laminated on a not-illustrated substrate. The L0 layer is provided with: a lead-in area 101-0 including a first management information recording area 21 and a second management information recording area 20; a user data area 102-0; and a middle area 104-0, from the inner to the outer circumferential side. On the other hand, the L1 layer is provided with: a middle area 104-1; a user data area 102-1; and a middle area 104-1, from the outer to the inner circumferential side. Upon the reproduction of such a two-layer type optical disc 100, the reproduction in the L0 layer or the L1 layer is performed, depending on which recording layer has the focus position of laser light, irradiated from the lower side to the upper side in FIG. 13. Incidentally, with regard to the reproduction order in an opposite method, at first, the reproduction may be performed from the inner to the outer circumferential side of the L0 layer, located on the rear as viewed from the irradiation side of the laser light, and then, the reproduction may be performed from the outer to the inner circumferential side of the L1 layer, located on the front as viewed from the irradiation side of the laser light.

In addition, the optical disc may be provided with a plurality of recording layers, such as three or more layers, and at least one of the plurality of recording layers may be provided with a first management information recording area and a second management information recording area.

According to the above-mentioned embodiments, the optical disc may be provided at least with: the first management information recording area in which one track is formed to reproduce the information on the basis of one track pitch, and the second management information recording area in which another track is formed to reproduce the information on the basis of another track pitch different from the one track pitch, and the groove shape of one track is different from the groove shape of another track. Consequently, on the information reproducing apparatus described later, it is possible to perform various auto control including the focus control and the tracking control, more highly accurately, and it is possible to realize more highly accurate information reproduction.

In the above-mentioned embodiments, as one specific example of the information recording medium, the single-layer type optical disc is explained, in which the recording or reproduction can be performed by a plurality of types of laser light, such as Blu-ray, Red-LD light, or infrared light, for example. In addition, the present invention can be also applied to an optical disc of a multilayer type (multiple layer type) having two or more recording layers, for example. Moreover, it can be also applied to various information recording media which support another high-density recording or high transfer rate.

Moreover, in the above-mentioned embodiments, as one specific example of the information reproducing apparatus, the information reproducing apparatus which accepts the single-layer type optical disc, for example, is explained. In addition, the present invention can be also applied to an information recording/reproducing apparatus which accepts the optical disc of a multilayer type (multiple layer type) having two or more recording layers, for example. Moreover, it can be also applied to an information recording/reproducing apparatus which accepts the various information recording media which support another high-density recording or high transfer rate.

The present invention is not limited to the aforementioned embodiments, and various changes may be made without departing from the essence or spirit of the invention which can be read from the claims and the entire specification. An information recording medium, an information reproducing apparatus and method, and an apparatus for and a method of manufacturing the information recording medium, which involve such changes, are also intended to be within the technical scope of the present invention.

INDUSTRIAL APPLICABILITY

The information recording medium, the information reproducing apparatus and method, and the apparatus for and the method of manufacturing the information recording medium according to the present invention can be applied to an information recording medium, such as a DVD (Digital Versatile Disc), a BD (Blu-ray Disc), and a CD (Compact Disc), and they can be further applied to an information reproducing apparatus and method, such as a DVD player, for reproducing the information on the information recording medium, and to an apparatus for and a method of manufacturing the information recording medium.

The invention claimed is:

1. An information recording medium comprising at least:
   a first information recording area in which a first track is formed to record or reproduce first information by laser light on the basis of a first track pitch; and
   a second information recording area in which a second track is formed to record or reproduce second information by the laser light on the basis of a second track pitch different from the first track pitch,
   at least one of a width and a depth of a groove of the first track being different from at least one of a width and a depth of a groove of the second track,
   identification information, which indicates whether or not at least one of the width and the depth of the groove of the first track is different from at least one of the width and the depth of the groove of the second track, being recorded in advance in at least one of said first information recording area and said second information recording area.

2. The information recording medium according to claim 1, wherein
   said information recording medium further comprises a judgment information recording area in which judgment information is recorded in advance, the judgment information being capable of judging said information recording medium, the judgment information being capable of reading without relying on tracking control, and
   the identification information is included in the judgment information.

3. An information reproducing apparatus for reproducing information recorded on an information recording medium comprising at least: a first information recording area in which a first track is formed to record or reproduce first information by laser light on the basis of a first track pitch; and a second information recording area in which a second track is formed to record or reproduce second information by the laser light on the basis of a second track pitch different from the first track pitch, at least one of a width and a depth of a groove of the first track being different from at least one of a width and a depth of a groove of the second track, identification information, which indicates whether or not at least one of the width and the depth of the groove of the first track is different from at least one of the width and the depth of the groove of the second track, being recorded in advance in at least one of said first information recording area and said second information recording area,
   said information reproducing apparatus comprising:
   an optical pickup device for irradiating the laser light and receiving reflected light thereof;
   an obtaining device for obtaining the identification information; and
   a reproducing device for reproducing the first information and the second information, on the basis of an output of said optical pickup device and the obtained identification information.

4. The information reproducing apparatus according to claim 3, wherein
   said information recording medium further comprises a judgment information recording area in which judgment information is recorded in advance, the judgment information being capable of judging said information recording medium, the judgment information being capable of reading without relying on tracking control, and the identification information is included in the judgment information, said information reproducing apparatus further comprises a reading device capable of reading the judgment information without relying on tracking control, and said reproducing device further reproduces the first information and the second information, on the basis of the read judgment information.

5. An information reproducing method on an information reproducing apparatus, including an optical pickup device for irradiating laser light and receiving reflected light thereof, to reproduce information recorded on an information recording medium comprising at least: a first information recording area in which a first track is formed to record or reproduce first information by the laser light on the basis of a first track pitch; and a second information recording area in which a second track is formed to record or reproduce second information by the laser light on the basis of a second track pitch different from the first track pitch, at least one of a width and a depth of a groove of the first track being different from at least one of a width and a depth of a groove of the second track, identification information (flag), which indicates whether or not at least one of the width and the depth of the groove of the first track is different from at least one of the width and the depth of the groove of the second track, being recorded in advance in at least one of said first information recording area and said second information recording area, said information reproducing method comprising:

an obtaining process of obtaining the identification information; and a reproducing process of reproducing the first information and the second information, on the basis of an output of said optical pickup device and the obtained identification information.

* * * * *